(12) United States Patent
Bennett

(10) Patent No.: US 7,830,845 B2
(45) Date of Patent: *Nov. 9, 2010

(54) ADAPTIVE COMMUNICATION MANAGEMENT TO ACCOMMODATE HIDDEN TERMINAL CONDITIONS

(75) Inventor: James D. Bennett, San Clemente, CA (US)

(73) Assignee: Broadcom Corporation, Irvine, CA (US)

(*) Notice: Subject to any disclaimer, the term of this patent is extended or adjusted under 35 U.S.C. 154(b) by 945 days.

This patent is subject to a terminal disclaimer.

(21) Appl. No.: 11/490,557

(22) Filed: Jul. 20, 2006

(65) Prior Publication Data
US 2007/0223434 A1    Sep. 27, 2007

Related U.S. Application Data

(63) Continuation-in-part of application No. 11/386,583, filed on Mar. 22, 2006, and a continuation-in-part of application No. 11/398,930, filed on Apr. 6, 2006, and a continuation-in-part of application No. 11/429,559, filed on May 5, 2006.

(60) Provisional application No. 60/802,373, filed on May 22, 2006.

(51) Int. Cl.
*H04W 4/00* (2009.01)
(52) U.S. Cl. .................. 370/338; 370/328; 370/447
(58) Field of Classification Search ................ 370/338, 370/390, 328, 445, 447, 310.2, 229, 235, 370/395.53, 315, 225
See application file for complete search history.

(56) References Cited

U.S. PATENT DOCUMENTS 6,041,235 A    3/2000    Aalto 6,393,032 B1 *    5/2002    Ikegami .................... 370/447

(Continued)

FOREIGN PATENT DOCUMENTS

| EP | 1545076 A2 | 6/2005 |
|---|---|---|
| EP | 1 587 221 A | 10/2005 |
| EP | 1587221 A2 | 10/2005 |
| EP | 1727388 A2 | 11/2006 |
| KR | 20030009169 | 1/2003 |

(Continued)

OTHER PUBLICATIONS

IEEE; IEEE 802.11h: Amendment 5: "Spectrum and Transmit Power Management Extensions in the 5 GHz band in Europe" IEEE STD 802.11H, Oct. 14, 2003.

(Continued)

*Primary Examiner*—Nick Corsaro
*Assistant Examiner*—Sarwat Chughtai
(74) *Attorney, Agent, or Firm*—Garlick Harrison & Markison; Bruce E. Stuckman

(57) ABSTRACT

A wireless access point and multiple wireless terminals exchange utilization, status, mobility and reception characteristics. Each wireless terminal generates reception characteristics based on transmissions received from the wireless access point and from other devices in the network. In one operating mode, the characteristics gathered by the wireless devices are forwarded to the wireless access point, and, based on all received characteristics, the wireless access point selects its own transmission power for different types of the transmission. In another mode, all characteristics are exchanged between every wireless terminal and the access point so that each can independently or cooperatively make transmission power control decisions. In a further mode, the wireless access point adjusts protocol parameters based on an assessment of the characteristics received from the client devices, to detect an event such as a hidden terminal condition.

15 Claims, 12 Drawing Sheets

U.S. PATENT DOCUMENTS

| | | | |
|---|---|---|---|
| 6,567,851 B1 * | 5/2003 | Kobayashi | 709/228 |
| 2002/0097703 A1 | 7/2002 | Nieczyporowicz | |
| 2004/0229563 A1 | 11/2004 | Fitton | |
| 2005/0152283 A1 * | 7/2005 | Ritzenthaler | 370/254 |
| 2005/0213532 A1 * | 9/2005 | Liu et al. | 370/328 |
| 2006/0056363 A1 | 3/2006 | Ratiu | |

FOREIGN PATENT DOCUMENTS

| | | |
|---|---|---|
| KR | 20040014954 | 2/2004 |
| KR | 1020050091017 A | 9/2005 |
| WO | 2004057806 A | 7/2004 |
| WO | 2006034578 A1 | 4/2006 |
| WO | 2006043902 A1 | 4/2006 |

OTHER PUBLICATIONS

European Search Report Dated Oct. 14, 2009, Application No. 07/024,006.

European Search Report: EP Application No. 07023487.7-2414/1942612; dated Nov. 26, 2009.

* cited by examiner

ADAPTIVE COMMUNICATION MANAGEMENT TO ACCOMMODATE HIDDEN TERMINAL CONDITIONS

CROSS REFERENCE TO RELATED PATENTS

This invention is claiming priority under 35 USC §119(e) to a provisionally filed patent application entitled ACCESS POINT MULTI-LEVEL TRANSMISSION PROTOCOL CONTROL BASED ON THE EXCHANGE OF CHARACTERISTICS, having a filing date of May 22, 2006, and an application No. 60/802,373, and is a continuation-in-part of the following pending patent applications: ACCESS POINT AND TERMINAL WIRELESS TRANSMISSION POWER CONTROL BASED ON POINT TO POINT PARAMETER EXCHANGES, having a filing date of Mar. 22, 2006, and an application Ser. No. 11/386,583; ACCESS POINT MULTI-LEVEL TRANSMISSION POWER AND PROTOCOL CONTROL BASED ON THE EXCHANGE OF CHARACTERISTICS, having a filing date of Apr. 6, 2006, and an application Ser. No. 11/398,930; and ACCESS POINT MULTI-LEVEL TRANSMISSION POWER CONTROL SUPPORTING PERIODIC HIGH POWER LEVEL TRANSMISSIONS, having a filing date of May 5, 2006, and an application Ser. No. of 11/429,559.

TECHNICAL FIELD OF THE INVENTION

This invention relates generally to wireless communication systems, and more particularly to adaptive protocols used by wireless communication devices within such wireless communication systems.

BACKGROUND OF THE INVENTION

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of client devices (e.g., laptops, personal computers, personal digital assistants, etc., coupled to a station) that communicate over a wireless link with one or more access points. The transmitting device (e.g., a client device or access point) transmits at a fixed power level regardless of the distance between the transmitting device and a targeted device (e.g., station or access point). Typically, the closer the transmitting device is to the targeted device, the less error there will be in the reception of the transmitted signal. However, as is generally understood in the art, wireless transmissions may include some error and still provide an accurate transmission. Thus, transmitting at power levels that provide too few errors is energy inefficient.

As is also generally understood in the art, many wireless communications systems employ a carrier-sense multiple access (CSMA) protocol that allows multiple communication devices to share the same radio spectrum. Before a wireless communication device transmits, it "listens" to the wireless link to determine if the spectrum is in use by another station to avoid a potential data collision. At lower received power levels, this protocol can lead to a hidden terminal problem when two devices, generally spaced far apart, are both trying to communication with a third device in the middle. While the device in the middle can "hear" the two devices on the periphery, these two devices cannot hear one another—potentially creating data collisions with simultaneous transmissions destined for the middle device.

Further limitations and disadvantages of conventional and traditional approaches will become apparent to one of ordinary skill in the art through comparison of such systems with the present invention.

SUMMARY OF THE INVENTION

The present invention sets forth a wireless network, access point, client device, integrated circuit and methods that determine transmission protocol parameters based on received characteristics substantially as shown in and/or described in connection with at least one of the figures, as set forth more completely in the claims that follow.

DETAILED DESCRIPTION

Figure 1:
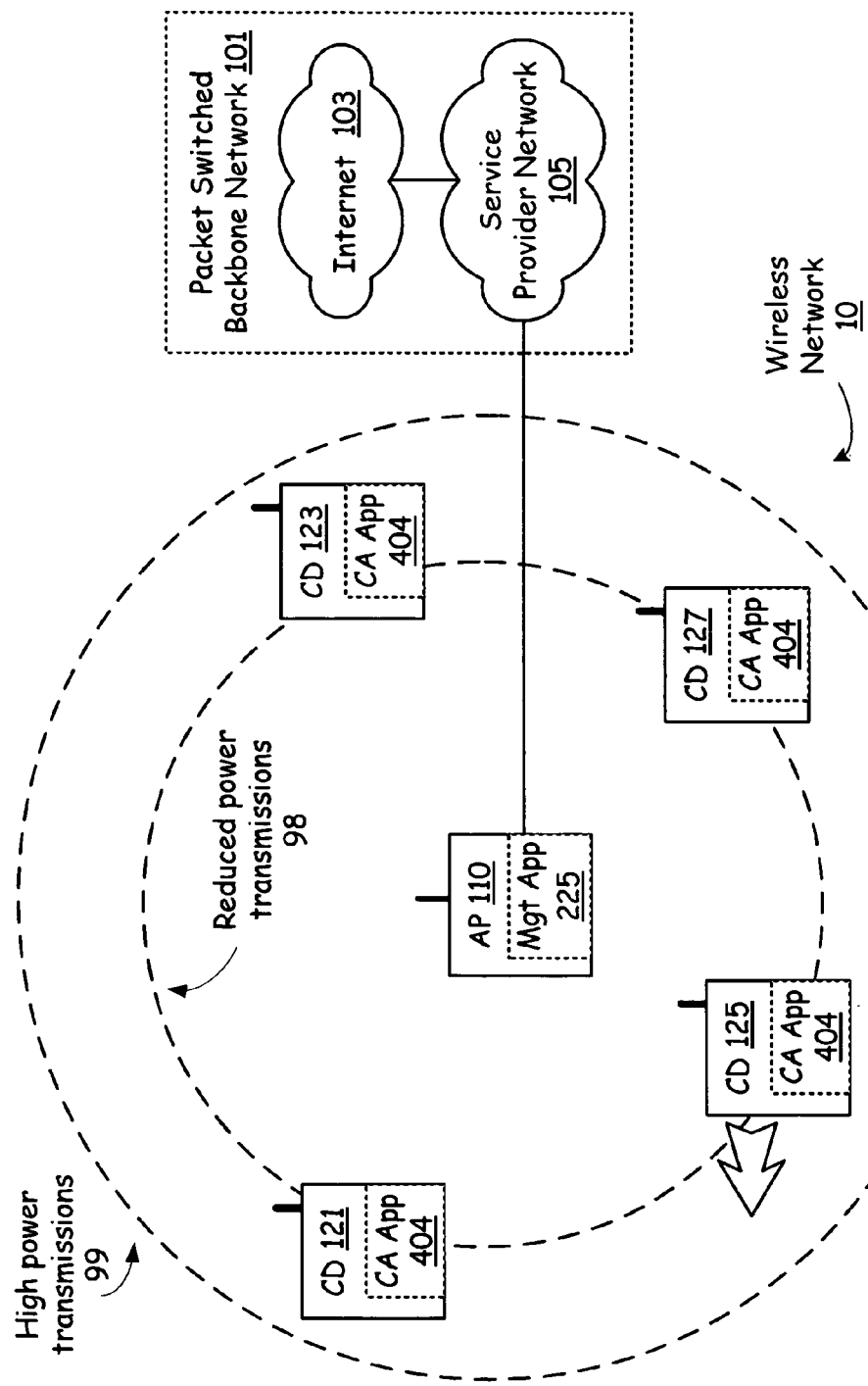
FIG. 1 presents a pictorial representation of a wireless network 10 in accordance with an embodiment of the present invention.

FIG. 1 presents a pictorial representation of a wireless network 10 in accordance with an embodiment of the present invention. A wireless network 10 includes an access point 110 that is coupled to packet switched backbone network 101. The access point 110 manages communication flow destined for and originating from each of client devices 121, 123, 125 and 127 over a wireless network 10. Via the access point 110, each of the client devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

The access point 110 is capable of transmitting high power transmissions 99 and reduced power level transmissions 98 at one or more reduced power levels, depending on the type of transmission, the characteristics of the particular client device to which the transmission is addressed and the characteristics of the other client devices that are associated with the access point 110. The access point 110 includes a management application 225, and each client devices 121, 123, 125 and 127 includes a client assessment application 404. The management application 225 and the client assessment applications 404 of each of the client devices 121, 123, 125 and 127 operate to select adequate transmission power settings that conserve battery power and limit unnecessary electromagnetic radiation.

In operation, the access point 110 is capable of transmitting at a selected power level that is based on factors such as the type of transmission, the reception characteristics, status characteristics, utilization characteristics, mobility characteristics, and the particular target device for the transmission. For instance, access point 110 can transmit periodic beacons at a high power level that include information relating to the access point 110 and the packet switched backbone network 101, such as a service set identifier (SSID) that identifies the network, a beacon interval that identifies the time between the periodic beacon transmissions, a time stamp that indicates the time of the transmission, transmission rates that are supported by the access point 110, parameters sets pertaining to specific signaling methods such as channel number, hopping pattern, frequency hop dwell time etc., capability information relating to the requirements that client devices need to associate with the access point 110 such as encryption and other privacy information, a traffic indication map that identifies stations in power saving mode, and/or other control information and data. These beacons are used to support new associations with client devices 121, 123, 125 and 127 that enter the proximity of access point 110 or that otherwise become active within this proximity. In particular, these beacon signals are sent with an address field, such as a universal address, that addresses the beacon transmission to all client devices. A client device that wishes to associate (or reassociate) with the wireless network 10, detects the beacon transmission and responds with an association response transmission, including the SSID, that begins the association (or reassociation) process between the new client device and the access point 110.

Access point 110 is further operable to transmit other network control and management information, such as association responses, reassociation responses, probe responses, clear to send signals, acknowledgements, power-save polls, contention-free end signals, and/or other information or data in packets or frames at reduced power levels in order to limit interference with neighboring networks, conserve power, etc. However, one or more other transmissions of access point 110 are sent between beacon transmissions at a higher power level to: 1) support associations or reassociations; 2) communicate channel busy indications; and 3) deliver channel other network information, such as pending message information, timing information, channel parameter information, etc. While these frames or packets may be addressed to other client devices, a client device scanning to associate with a new wireless network, such as wireless network 10, can detect these packets or frames for the limited purposes of determining the timing, protocol or rate of these transmissions, determining the received power level and identifying other information pertaining to the network, such as the SSID, that is sufficient to produce an association request. In this fashion, for example: 1) new associations can be supported at a frequency that is greater than the frequency of the periodic beacon transmissions; 2) pending messages can be detected and requested without having to wait for the next beacon; 3) hidden terminal problems caused by lower power transmissions can be mitigated; and 4) channel parameter adjustments can be made more rapidly.

Reduced power levels are determined based on reception characteristics relating to how well the client devices 121, 123, 125 and 127 receive these beacon transmissions can be generated by the client assessment applications 404 of these client devices and transmitted back to the access point 110. The response by the management application 225 depends on the reception characteristics received from the client devices 121, 123, 125 and 127. For example, the management application 225 may decide to select a customized power level for the access point to transmit to each of the client devices 121, 123, 125, and 127 that may be reduced from the maximum power output, but that provides sufficient power to be received by that particular client device. The management application 225 also selects a high or intermediate power level that is sufficient to be received by all of the client devices 121, 123, 125 and 127. Specific packets, such as all acknowledgements (ACKs), every other ACK, every nth ACK etc., all data packets, occasional data packets, etc. are transmitted by the access point 110 at the high or intermediate power level that will reach all of the client devices 121, 123, 125 and 127, with the remaining packets transmitted at the power level that is customized for the particular client device 121, 123, 125 or 127 to which the packets are addressed. Alternatively, the management application 225 may decide to select a lower power level for transmissions by the access point 110 that will reach the client devices 121, 123 and 127, but not the client device 125. For transmissions to the client device 125, a higher power level will be selected. In addition, periodic or occasional transmissions from the access point 110 will be sent at the higher power level even though they are not destined for the client device 125, and other periodic or occasional transmissions will be sent at the highest power level to support associations and so on. Many other variations are possible that involve selecting various power transmission levels for the access point 110, with such power levels being selected to reach one or more associated client devices, to reach all associated client devices, and to reach unassociated client devices.

Similarly, the management application 225 also determines the transmission power levels of the client devices 121, 123, 125 and 127. It does this by retrieving information (e.g., reception characteristics) from each of the client devices regarding their ability to detect and receive transmissions from the client devices 121, 123, 125 and 127. In the present embodiment, because no direct transmissions occur between the client devices 121, 123, 125 and 127, the retrieved information always relates to transmissions sent by the client devices 121, 123, 125 and 127 to the access point 110. In other embodiments, the transmissions may in fact be direct. Regardless, from the retrieved information, the access point 110 delivers power control instructions to each of the client devices 121, 123, 125 and 127. Such power control instructions may merely command that all transmissions occur at an identified, single power level. Alternatively, the power control instructions may indicate that a single client device use multiple different power levels in communicating with the access point 110. For example, because transmissions from the client device 121 may be easily detected by all of the other client devices 123, 125 and 127 and the access point 110, the access point 110 commands that the client device 121 always transmit at a low power level that all network participants can detect. Because transmissions from the client device 121 cannot be easily detected by the client device 127, the access point 110 directs that the client device 121 normally transmit at a low power level with periodic or occasional transmissions at the highest power level. For example, the highest power level transmissions might be every third data packet and/or every third acknowledgment packet. As before, many other variations are possible that involve selecting various power transmission levels for the client devices, with such power levels being selected to reach the access point 110 and to reach one or more other associated client devices, all associated client devices, and unassociated client devices.

Reducing the transmitted power of the access point for some transmissions, and of the client devices themselves, reduces the power consumption of these devices—potentially extending the life of the devices and the battery life for devices that are battery powered. In addition, the resulting wireless network 10 is more "transmission friendly" to neighboring networks. The transmission of beacons and other intermediate transmissions at high power promotes the association of new client devices to wireless network 10. The transmission of packets addressed to a particular client device 121, 123, 125 or 127, at a customized power level enhances the power efficiency of the network. The transmission of selected packets at the high or intermediate power level, that will reach all of the client devices 121, 123, 125 and 127 that are associated with access point 110, helps reduce hidden terminal problems by letting other client devices know that a device is transmitting and supports associations by client devices that can detect the high or intermediate power level, but not the lower customized power level transmissions.

For example, as directed by a client assessment application 404, the client device 121 assesses transmissions from the access point 110 and the client devices 123, 125 and 127. The client device 121 generates reception characteristics based on the assessment. The client device 121 also gathers local status information, anticipated bandwidth utilization characteristics and mobility information, and, based thereon, generates status characteristics, utilization characteristics, and mobility characteristics. The client device 121 delivers the reception characteristics, status characteristics, utilization characteristics and mobility characteristics to the access point 110 for use by the management application 225. According to their client assessment applications 404, the other of the client devices 123, 125 and 127 similarly gather and deliver their local status characteristics, utilization characteristics and mobility characteristics along with reception characteristics relating to others of the client devices and the access point 110.

The access point 110, in accordance with the management application 225, also generates its own reception characteristics and utilization characteristics. The management application 225 adjusts the access point's transmission power and controls the transmission power of each of the client devices 121, 123, 125 and 127 based on: 1) the reception characteristics received from each of the client devices 121, 123, 125 and 127 regarding others of the client devices and the access point; 2) locally generated reception characteristics and utilization characteristics regarding each of the client devices 121, 123, 125 and 127; 3) status characteristics from each of the client devices 121, 123, 125 and 127; 4) mobility characteristics from each of the client devices 121, 123, 125 and 127; and 5) utilization characteristics generated by each of the client devices 121, 123, 125 and 127. The access point 110 achieves such control by causing the access point 110 to deliver control instructions to each of the client devices 121, 123, 125 and 127 via the wireless network. Each of the client devices 121, 123, 125 and 127 respond to the control instructions by adjusting its transmit power. Such overall control takes advantage of particular, current circumstances, including current operational status, relative positions and properties of any the network nodes (e.g., the access point 110 and the client devices 121, 123, 125 and 127).

As used herein, "reception characteristics" includes any data, generated based on received wireless transmissions, that rates or can be used to rate the quality, accuracy or strength of such received wireless transmissions. For example, reception characteristics might include any one or more of a Received Signal Strength Indication (RSSI), bit/packet error, current/historical error rates, multipath interference indications, Signal to Noise Ratio (SNR), fading indications, etc.

Status characteristics includes any data relating to an underlying device's prior, current or anticipated readiness, abilities or capacity for participating on the wireless network. Status characteristics include, for example, the amount of power available, such as whether alternating current (AC) power is available or only battery power, and, if battery power, anticipated battery life at various transmission power levels and at various levels of participation, etc. Status characteristics also include whether a device is currently "sleeping" or inactive or in a low power idle state. It may also include historical information anticipating the current status duration and anticipated status characteristics changes. Status characteristics may also include status information relating to each underlying communication software application that runs on a client device. For example, on a single client device two communication applications might be present with one in an inactive state and the other actively communicating. Status characteristics would identify such activity and inactivity.

Utilization characteristics include any parameter that indicates a prior, current or anticipated bandwidth requirement, usage or usage characteristic. Utilization characteristics might include anticipated QoS (Quality of Service) requirements, upstream/downstream bandwidth usage, bandwidth usage characteristics, idle versus active status characteristics, underlying data/media types (e.g., voice, video, images, files, database data/commands, etc.) and corresponding requirements, etc.

Mobility characteristics include for example indications as to whether the underlying device is: 1) permanently stationary, e.g., a desktop client computer, game console, television, set top box or server; 2) capable of mobility, e.g., a cell phone or mobile VoIP (Voice over Internet Protocol) phone, PDA (Personal Digital Assistant), and palm, laptop or pad computer; and 3) currently moving, e.g., any one or more of current position and direction, velocity and acceleration information.

By way of example, the access point 110 may transmit at ten discrete power levels at 1 dB increments, say 10 through 1, with 10 corresponding to the full power transmission, 9 corresponding to a 1 dB reduction in transmitted power, 8 corresponding to a 2 dB reduction in power, etc. Based on reception characteristics received from client devices 121, 123, 125, and 127, management application 225 of access point 110 determines the following power levels are sufficient to be received by each client device:

| Client Device | Power level |
| --- | --- |
| 121 | 5 |
| 123 | 6 |
| 125 | 8 |
| 127 | 6 |

Access point 110 transmits beacons at a power level of 10. Access point 110 transmits every other ACK with a power level of 8, 9 or 10, sufficient to be received by each client device 121, 123, 125 and 127 and to support the association by other client devices. Other packets from access point 110 are transmitted at the power level assigned to the addressee client device. Packets addressed to client devices 123 or 127 are transmitted at power level 6, packets addressed to client device 121 are transmitted at power level 5, packets addressed to client device 125 are transmitted at power level 8.

While the reception characteristics are described above as generated in response to access point beacons, the reception characteristics can also be collected by a given one of the client devices 121, 123, 125 and 127 through a test mode and through "sniffing". In the test mode, the access point 110 directs each of the client devices to respond with reception characteristics in response to transmissions from the access point 110 at one or more transmission power levels. Also, in the test mode, the access point 110 directs one of the client devices 121, 123, 125 and 127 to transmit at one or more selected power levels and all others to generate and deliver reception characteristics in response. The access point 110 may similarly direct each of the others of the client devices 121, 123, 125 and 127 to send the test transmissions and correspondingly have the others respond by generating reception characteristics. Testing can be conducted periodically or whenever conditions indicate that transmission power adjustments may be needed. Devices that are mobile may undergo testing more often than those that are stationary. Collecting reception characteristics through sniffing involves a client device listening to ordinary (not test) transmissions from and to the access point 110. The access point 110 may request reception characteristics based on such sniffing or may be delivered same occasionally or periodically (e.g., as significant changes are detected) and without request by each client device. Similarly, without request, status characteristics, utilization characteristics and mobility characteristics may be reported as significant changes therein occur by a client device to the access point 110.

Further, while the selected power levels used by access point 110 to transmit to each client device are described above as being determined based on reception characteristics, management application 225 can likewise use status characteristics, utilization characteristics and mobility characteristics and with periodic updates thereto, to determine the customized power levels for transmission to each client device 121, 123, 125, and 127 and the high or intermediate power level that will reach all client devices. For example, the client device 123 generates reception characteristics from transmissions between the client device 121 and the access point 110. The client device 123 delivers the reception characteristics generated to the access point 110. The client device 123, a stationary desktop computer, has access to AC power, and has a full-duplex, video streaming application running in an active communication state which requires significant bandwidth and QoS. The client device 123 communicates such corresponding status characteristics, utilization characteristics and mobility characteristics to the access point 110. The client device 125, a battery powered device with significant remaining battery life, is operating with little communication traffic either direction. The client device 125 generates reception characteristics for all communication exchanges. The client devices 121 and 127, portable communication devices with minimal power resources, both have one or more communication applications active that require light but continuous bandwidth demands. Both also generate reception characteristics regarding communication flowing in all directions. Such reception characteristics and underlying status characteristics, utilization characteristics and mobility characteristics are communicated to the access point 110. The management application 225 of the access point 110 considers all such received communications, and for example, may operate at the higher overall transmission power with protocol supported QoS and priority when transmitting to client device 123. When transmitting at the high or intermediate power level, all of the other client devices should receive the transmissions and attempt to avoid simultaneous, interfering transmissions. Further, the management application 225 may increase the power level for transmission to client device 125, given the mobility of this device and the potentially changing reception characteristics that this client device may experience.

For transmission to the access point 110 from the client devices 121, 123, 125 and 127, the management application 225 can determine a transmission power level, based on the reception characteristics (including receptions by client devices 121, 123, 125 and 127 of transmissions from other client devices), status characteristics, utilization characteristics and mobility characteristics, that are transmitted by access point 110 to each respective client device. By way of further examples, the client devices 121 and 127 may each adequately receive transmissions from the access point 110.

An analysis of reception characteristics and status characteristics by access point 110 may also reveal that the client device 123 is easily detected by each of the other devices and that it is running low on battery power. In response, the access point 110 can select a reduced transmission power level for the client device 123 that extends its battery life. An analysis of reception characteristics and mobility characteristics by access point 110 may reveal that the client device 125 is highly mobile. Rather than relying solely on reception characteristics, the access point 110 selects a transmission power level for the client device 125 that takes into consideration its possible movement about the transmission range of the wireless network 10.

An analysis of their reception characteristics by access point 110 may reveal a hidden terminal condition, that includes a potential hidden terminal condition. For example, the access point 110 identifies a hidden terminal condition when reception characteristics received from the client device 127 indicate a failure by the client device 127 to detect transmissions from the client device 121. The access point 110 may also identify potential hidden terminal conditions when reception characteristics received from the client device 127 indicate, for instance, that the client device 127 can barely detect transmissions from the client device 121. In these circumstances, the access point 110 can identify a potential hidden terminal condition between the client devices 121 and 127 from reception characteristics generated by the client device 127 and sent to the access point 110, that indicate that the RSSI and/or SNR of transmissions by the client device 121 is/are below a threshold that corresponds to reliable communications. In addition, other reception characteristics can also be used to identify a potential hidden terminal condition such as a bit/packet error rate above a threshold and/or marginally acceptable or unacceptable indications of multipath interference or fading.

Further, the access point 110 can detect a potential hidden terminal condition where the ability to detect transmissions by from the client device 127 by the client device 121 is progressively becoming more difficult. In particular, the client device 127, either routinely, on a periodic or regular basis, or in response to the detection of marginal reception characteristics from another device, such as the client device 127, can determine reception characteristics at two or more times and send these reception characteristics to the access point 110 in separate transmissions or in a single transmission, along with an indication of their times or order in time. In response, the access point 110 can identify a potential hidden terminal condition based on a worsening in bit/packet error rate, multipath interference or fading over time, or based on a progressive dropping of in RSSI, SNR, etc.

In addition, other received characteristics such as utilization, mobility and status characteristics can likewise be used by the access point 110 to determine potential hidden terminal conditions. For instance, if the client device 121 is being received at marginal reception levels by the client device 127 and is further experiencing a drop in battery power or is nearing the end of its estimated battery life, a hidden terminal condition may be imminent between the client device 121 and 127. In addition, if the client device 125 is being received at marginal reception levels by the client device 123 and the access point 110 determines that the client device 125 is moving further away from the client device 123, based on mobility characteristics (e.g. GPS data, velocity, etc.), a hidden terminal condition may be imminent between the client device 123 and 125.

To avoid such existing or potential hidden terminal conditions, the access point 110 may choose to: a) boost its transmission power; b) boost the transmission power of one or all of the associated client devices; c) adjust underlying protocol parameters; d) select an alternate protocol; e) employ an additional protocol; f) direct one or more devices to enter an inactive or sleep mode, and/or g) hand off or otherwise direct one or more of the client devices to the service of another access point. For example, in the event that a client device, such as the client device 127, has difficulty detecting transmissions from the client device 121 due to low or decreasing signal strength, unacceptable or increasing fading and/or interference, the access point 110 can increase the transmit power or modify the protocol parameters of the client device 121 (including the selection of an alternative protocol with more favorable protocol parameters or the adoption of an additional protocol that is used between at least the access point 110 and the client device 121) so that transmissions by the client device 121 include more aggressive error correcting codes, and/or require smaller data payloads or packet length, with more frequent acknowledgements by the access point 110 transmitted at a power level sufficient to be heard by the client device 127. In addition, the back off times can be increased for transmissions by the client device 127 or other channel access requirements can be changed, to lessen the possibility of a contention with client device 121.

In addition, in the event that the movement of a mobile client device, such as the client device 125, creates a potential hidden terminal condition with one or more other client devices such as the client device 123, the transmit power level of client device 125 and access point 110 can be boosted, a more aggressive error correcting code can be employed, the back-off times for the client device 123 can be increased and the packet size of packets sent by client device 125 can be decreased to lessen the chances of contention. In the alternative, the client device 125 can be handed-off to a neighboring access point (not shown) that, based on reception characteristics received by the access point 110, is receiving client device 125 with sufficient signal strength to support an association.

Further, in the event that a particular client device such as the client device 121 is experiencing decreased transmit power due to a drop in battery power or that is otherwise reaching the end of its battery life, the access point 110 can command the client device 121 into a sleep mode to avoid potential hidden terminal conditions. The access point 110 can potentially reawaken the client device 121 after a period of time with a decreased transmit power, sufficient to reach the access point 110 and calculated to extend battery life while setting long back-off periods for the client devices 123, 125 and 127 to lessen the chance of contention. In another mode of operation, the access point 110 can alternatively inactive two client devices, such as the client devices 121 and 127 that are liable to experience a hidden terminal condition, for instance, inactivating the client device 127 when the client device 121 is reawakened, and reawakening the client device 127 when the client device 121 is inactivated, etc.

As illustrated above, to address hidden terminal conditions, the management application 225 may adjust the protocol or protocols used in communicating between the access point 110 and the client devices 121, 123, 125 and 127 and power levels inherent in and associated therewith. In one mode of operation, management application 225 selectively adjusts one or more protocol parameters, such as the packet length, data rate, forward error correction, error detection, coding scheme, data payload length, contention period, and back-off parameters used by access point 110 in communication with one or more of the client devices 121, 123, 125 and 127, based on the analysis of the reception characteristics, status characteristics, utilization characteristics, and mobility characteristics. In this fashion, the protocol parameters can be adapted for power conservation, to mitigate potential hidden terminal conditions, and to minimize unnecessary transmission power utilization based on the conditions of the network. These conditions for example include not only the mobility, utilization, status, and reception characteristics of a particular device, but the mobility, utilization, status, and reception characteristics of a plurality of devices, and how well each client device receives other client devices.

In a further mode of operation, access point 110 and client devices 121, 123, 125 and 127 can operate using a plurality of different, and potentially complimentary, protocols having different protocol parameters. Access point 110 can likewise adjust protocol parameters by selecting a particular one of a plurality of protocols that suits the particular conditions present in the wireless network 10, as determined based on an assessment of utilization characteristics, status characteristics, mobility characteristics and/or reception characteristics. For instance, an access point can select from 802.11(n), 802.11(g) or 802.11(b) protocols having different protocol parameters, data rates, etc., based on the particular protocol best suited to accommodate the characteristics of the client devices 121, 123, 125 and 127 that are present. For example, hidden terminal conditions along with other reception parameters may cause an access point to simultaneously: 1) use a first protocol with a first set of parameters to service a first one or more client devices; 2) use a second protocol with a second set of parameters to service a second one or more client devices; 3) use the second protocol with a third set of parameters to service a third one or more client devices; and 4) hand off a fourth one or more client devices to a neighboring (or overlapping) access point.

It should be noted that these examples are merely illustrative of the many functions and features presented in the various embodiments of the present invention set forth more fully in conjunction with the description and claims that follow.

Figure 2:
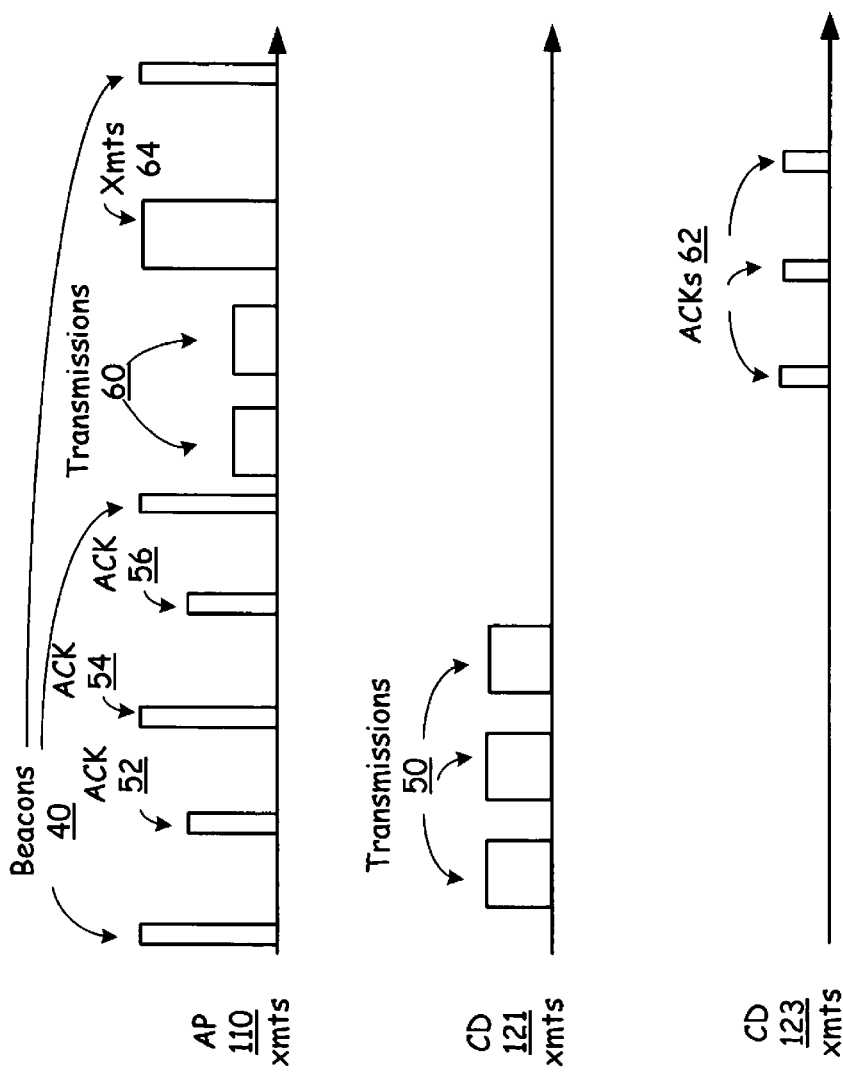
FIG. 2 presents a timing diagram of transmissions by the access point 110 and the client devices 121 and 123 in accordance with an embodiment of the present invention.

FIG. 2 presents a timing diagram of transmissions by the access point 110 and the client devices 121 and 123 in accordance with an embodiment of the present invention. In particular, FIG. 2 shows exchanges between access point 110 and client device 121 and exchanges between access point 110 and client device 123. While exchanges between the access point 110 and two client devices are shown, the invention herein likewise applies for use with a greater number of client devices. In this diagram, transmissions of data, and network management and control information such as data packets, acknowledgements and beacons are represented by blocks whose relationship to the timing of other events can illustrate a mode of operation, however, the durations of these blocks are not shown to scale. The relative amplitude of these blocks represents the power level of a particular transmission, with taller blocks being transmitted at greater power and shorter blocks being transmitted at lower power.

In this example, the access point 110 transmits at a high power level, such as the highest power level, for the periodic beacons 40. Transmissions to client device 121, such as acknowledgements 52 and 56 are at a first reduced power level that is sufficient for reception by client device 121. Transmissions to client device 123, such as transmissions 60 are at a second reduced power level that is sufficient for reception by client device 123. Selected acknowledgements, such as acknowledgement 54 and selected transmissions such as transmission 64, are at a higher power level such as the power level used for the beacons 40 or a power level that can be heard by all of the client devices in the network. Transmissions 50 by client device 121 are at the power level selected by access point 110 for this device based on the characteristics of client device 121. Acknowledgements 62 by client device 123 are transmitted at the power level selected by access point 110 for client device 123 device based on the characteristics of this device.

In this fashion, access point 110 transmits selected wireless transmissions, such as beacons 40, acknowledgement 54 and transmission 64, at a first power level designed to reach both client devices 121 and 123 and potentially other devices that wish to associate with wireless network 10. Other wireless transmissions, such as periodic acknowledgements 52 and 56 by the access point 110, are sent at a second power level that is selected to support both delivery of the packets to the client device 121 and detection of these transmissions by the client device 123, the first power level being greater than the second power level. In addition, wireless transmissions, such as transmissions 60 are sent at a third power level selected to support receipt of the packets by client device 123 device, the second power level being greater than the third power level.

The selection of the particular intermediate transmissions by access point 110, that are between the periodic beacons 40 and are sent at a high power level to support association by a client device, can be performed in several ways. For instance, transmissions of a particular type, such as the transmission of data packets or frames, acknowledgement packets or frames, or other types of control or management packets or frames can alternate between N transmissions at the reduced power level and M transmissions at the higher level, where N and M are integers that are greater than zero. For instance, 1 of 2, 1 of 3, 1 of 4, 1 of 6, or 1 of 16, etc., data frames or packets can be sent at the high power level with the other packets sent at the reduced power level. Or for instance, 1 of 2, 1 of 3, 1 of 4, 1 of 6, or 1 of 16, etc., acknowledgement frames or packets can be sent at the high power level with the other packets sent at the reduced power level. Alternatively, the access point 110 can keep track of the timing between beacons 40 to identify one or more periodic high-power transmission windows, such as midway between these beacons or equally spaced between these beacons. Transmissions of data, control or management packets or frames that occur during these high-power transmission windows are automatically transmitted at the high power level.

Figure 3:
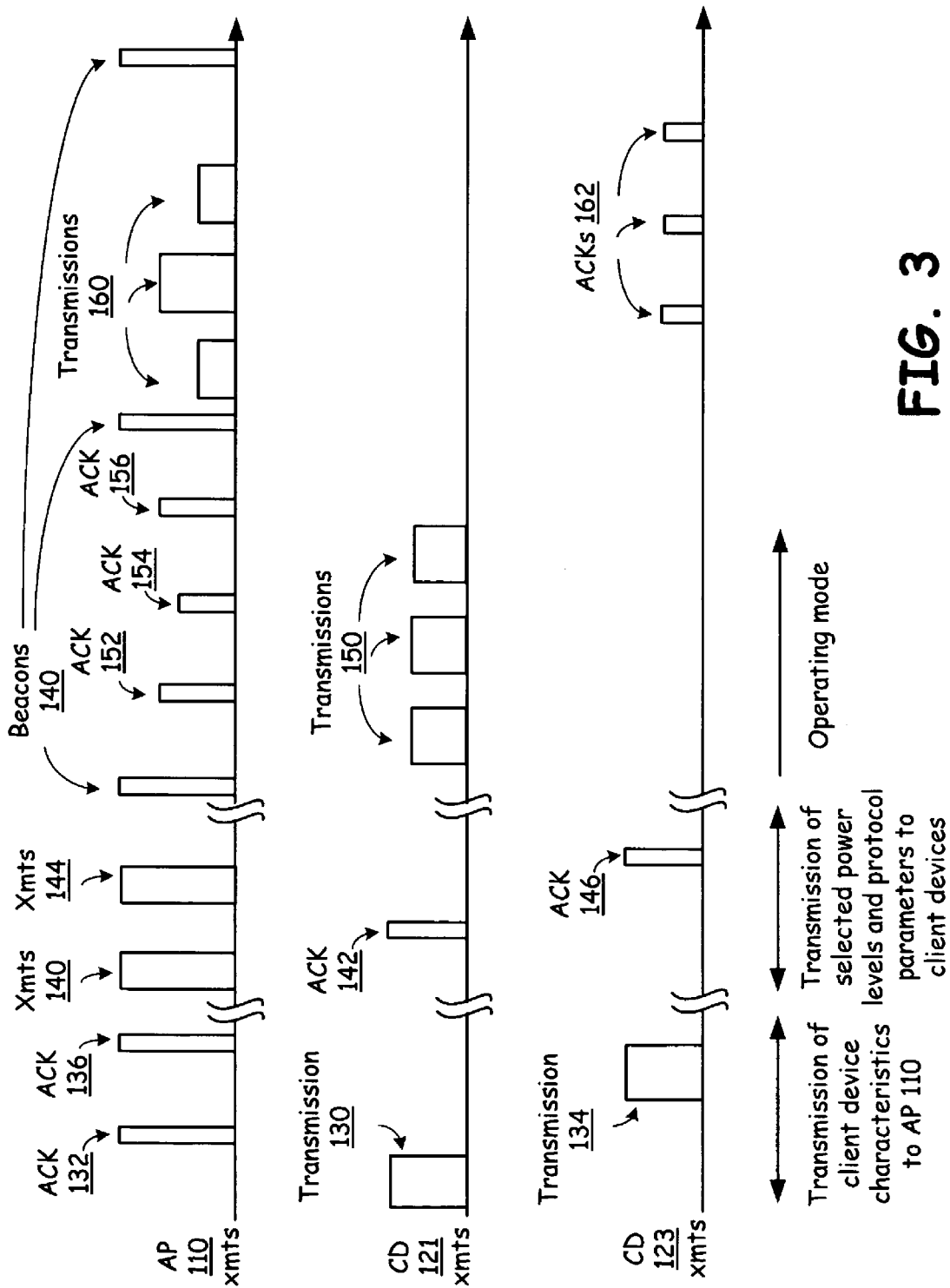
FIG. 3 presents a timing diagram of transmissions by the access point 110 and the client devices 121 and 123 in accordance with an embodiment of the present invention.

FIG. 3 presents a timing diagram of transmissions by the access point 110 and the client devices 121 and 123 in accordance with an embodiment of the present invention. In particular, FIG. 3 shows exchanges between access point 110 and client device 121 and exchanges between access point 110 and client device 123. While exchanges between the access point 110 and two client devices are shown, the invention herein likewise applies for use with a greater number of client devices. In this diagram, transmissions such as data packets, acknowledgements and beacons are represented by blocks whose relationship to the timing of other events can illustrate a mode of operation, however, the durations of these blocks are not shown to scale. The relative amplitude of these blocks represents the power level of a particular transmission, with taller blocks being transmitted at greater power and shorter blocks being transmitted at lower power.

Prior to the beginning of the time shown by FIG. 2, client device 121 has generated first characteristics by evaluating transmissions, such as beacons, test transmissions or routine on-going transmissions, from both the access point 110 and other client devices, and further, by evaluating its own utilization, status and mobility. Likewise, client device 123 has generated second characteristics by evaluating transmissions from both the access point 110 and other client devices, and its own utilization, status and mobility. Client device 121 transmits, at a preset power level, transmission 130 to the access point 110 that includes the first characteristics. Access point generates an acknowledgement 132 in response at a first power level, such as a high or full power level. Client device 123 transmits, at a preset power level, transmission 134 to the access point 110 that includes the second characteristics. Access point generates an acknowledgement 136 in response at the high power level.

The management application 225 of access point 110, having received the first characteristics from client device 121 and second characteristics from client device 123. assesses both the first characteristics and the second characteristics and, based on the assessment, selects both a second power level of the plurality of power levels for transmissions by the access point 110 to the client device 121 and a third power level of the plurality of power levels for transmissions by the access point 110 to the client device 123. Although not shown, the access point 110 may select an alternate protocol, based on such assessment, and coordinate switch-over from that currently being used to the alternate protocol.

The management application 225 determines a selected power level for transmissions by the client device 121 and a selected power level for transmissions by the client device 123 and other possible protocol parameters that are sent, respectively, to clients devices 121 and 123 in transmissions 140 and 144 that are acknowledged, respectively, by acknowledgements 142 and 146.

After the transmission powers and protocol parameters for the access point 110 and the client devices 121 and 123 are established, the operating mode begins. In this example, the access point 110 transmits at a highest power level for the periodic beacons 140. Transmissions to client device 121, such as acknowledgement 154 are at a first reduced power level that is sufficient for reception by client device 121. Transmissions to client device 123, such as transmissions 160 alternate between a second reduced power level that is sufficient for reception by client device 123 and the first reduced power level. In addition, periodic acknowledgements, such as acknowledgements 152 and 156 are at a higher power level that can be heard by all of the client devices in the network and that provide better support for the association by other client devices than acknowledgement 154. Transmissions 150 by client device 121 are at the power level selected by access point 110 for this device based on the characteristics of client device 121. Acknowledgements 162 by client device 123 are transmitted at the power level selected by access point 110 for client device 123 device based on the characteristics of this device.

In this fashion, access point 110 transmits selected wireless transmissions, such as beacons 140 at a first power level, to reach both client devices 121 and 123 and potentially other devices that wish to associate with wireless network 10. Other wireless transmissions, such as periodic acknowledgements 152 and 156 by the access point 110, are sent at a second power level that is selected to support both delivery of the packets to the client device 121 and detection of these transmissions by the client device 123 and potentially other devices that wish to associate with wireless network 10, the first power level being greater than the second power level. In addition, wireless transmissions, such as transmissions 160 are sent at a third power level selected to support receipt of the packets by client device 123 device, the second power level being greater than the third power level.

Alternatively, if circumstances warrant, the access point 110 could choose all of its transmissions other than the highest power beacons to be tailored specifically for the client device 121 even though the client devices 123 cannot hear such transmissions. To combat such hidden terminal condition, the access point 110 commands the client device 121 to transmit at a power level sufficient for the client device 123 to detect. With a protocol that requires at least periodic confirmation by the client device 121 (e.g., interspersed acknowledge packets), even though the client device 121 cannot hear the access point 110, the client device 123 will hear the periodic confirmation transmissions (or payload transmissions from the client device 121), and thus determine that the access point 110 is engaged. At the same time, the access point 110 may determine that the client device 121 can hear transmissions by the access point 110 at power levels only great enough to adequately support the client device 123. Based on this determination, the access point 110 might direct the client device 123 to transmit at a power level only sufficient to adequately reach the access point 110 but not the client device 121.

Of course, various other circumstances warrant various other transmission power and protocol configurations. For example, if the access point 110 determines that transmissions from and to the client device 121 can be selected such that they provide adequate performance yet not be heard by the client device 123, the access point 110 may adopt such power levels. Because the client device 123 has indicated an idle status, the access point 110 may accept any unexpected interference from the client device 123 as it exits the idle status to transmit during a communication exchange between the client device 121 and the access point 123. Thereafter, the access point 110 can change power levels to accommodate the both of the client devices 121 and 123 in their active states. Or, instead of merely tolerating such unexpected interference, the access point 110 may employ a different protocol operation or an entirely different protocol to accommodate such circumstances. An example of this would be for the access point 110 to command that the client device 123 only attempt transmissions from the idle state during a fixed period after a beacon and thereafter avoid communication exchanges with the client device 121 during such period. This change might be supported within the current protocol, or might require a change from the current protocol to another. Similarly, instead of switching protocols, the access point 110 may choose to operate two different protocols at the same time, by directing at least one of the two of the client devices 121 and 123 to switch. Further, if the access point 110 detects that the client device 123 is plugged into AC (Alternating Current) power, it may direct the client device 123 to always transmit at a higher or highest power, while directing the client device 121 (that may operate on limited battery power) to transmit at only that necessary to reach the access point 110. Many other circumstances and adaptation by the access point 110 to reduce overall unnecessary transmission power usage by one or more of the client devices 121 and 123 and the access point 110 itself are contemplated.

Figure 4:
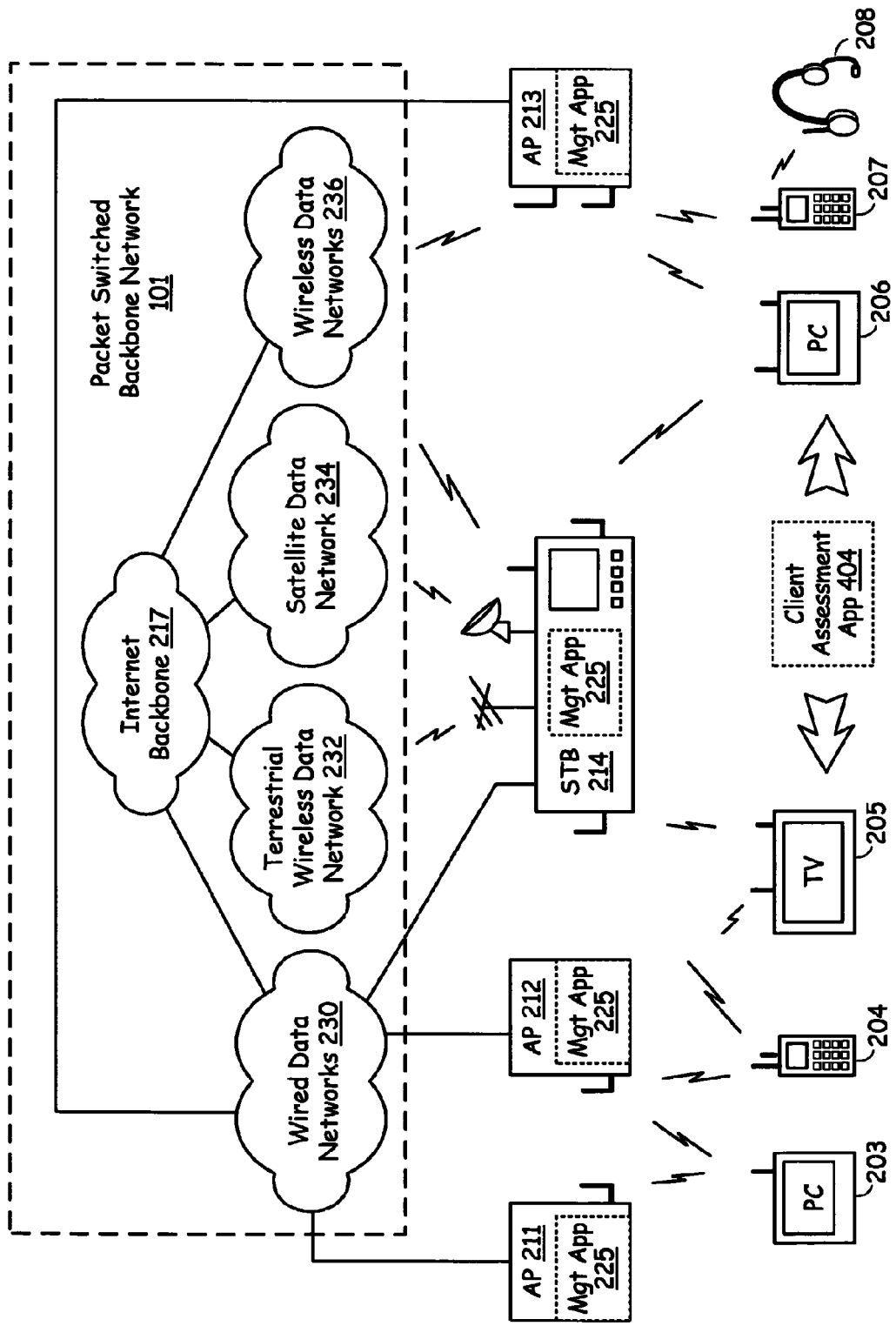
FIG. 4 presents a pictorial representation of a wireless network 10 that shows examples of client devices and various modes of connection between access points and packet switched backbone network 101 in accordance with an embodiment of the present invention.

FIG. 4 presents a pictorial representation of a wireless network 10 that shows examples of client devices and various modes of connection between access points and packet switched backbone network 101 in accordance with an embodiment of the present invention. Packet switched backbone network 101 includes wired data networks 230 such as a cable, fiber, or other wired or hybrid network for providing access, such as narrowband, broadband or enhanced broadband access to content that is local to wired data network 230 or is otherwise accessed through Internet backbone 217. In particular, examples of wired data networks 230 include a public switched telephone network (PSTN), cable television network or private network that provides traditional plain old telephone service, narrowband data service, broadband data service, voice over internet protocol (IP) telephony service, broadcast cable television service, video on demand service, IP television service, and/or other services.

Packet switched backbone network 101 further includes a terrestrial wireless data network 232 that includes a cellular telephone network, personal communications service (PCS), general packet radio service (GPRS), global system for mobile communications (GSM), or integrated digital enhanced network (iDEN). These networks are capable of accessing wired data networks 230 through internet backbone 217 and for providing the many of the services discussed in conjunction wired data networks 230 in accordance with international wireless communications standards such as 2G, 2.5G and 3G.

Packet switched backbone network 101 also includes satellite data network 234 for providing access to services such as satellite video services, satellite radio service, satellite telephone service and satellite data service. In addition, packet switched backbone network 101 includes other wireless data networks 236 such as a WiMAX network, ultra wideband network, edge network, Universal Mobile Telecommunication System, etc., for providing an alternate medium for accessing any of the services previously described.

Access points 211-213 provide access to WAN 101 through a wired connection to wired data networks 230. In addition, access point 213 is capable of providing access to packet switched backbone network 101 through wireless data networks 236. Set top box (STB) 214 includes the functionality of access points 211, 212, and/or 213 while further including optional access to terrestrial wireless data network 232, and satellite data network 234. In particular, STB 214 optionally includes additional functions and features directed toward the selection and processing of video content such as satellite, cable or IP video content. While the term "access point" and "set top box" have been used separately in the context of this discussion, the term "access point" shall include both the functionality and structure associated with a set top box, including but not limited to, STB 214.

A plurality of client devices are shown that include personal computers (PC) 203 and 206, wireless telephones 204 and 207, television (TV) 205, and wireless headphones 208. These client devices are merely examples of the wide range of client devices that can send data to and receive data from access points 211-213 and STB 214. While each of these client devices are shown pictorially as having integrated transceiver circuitry for accessing a corresponding access point, an separate wireless interface device may likewise be coupled to the client module via a port such as a Universal Serial Bus (USB) port, Personal Computer Memory Card International Association (PCMCIA) Institute of Electrical and Electronics Engineers (IEEE) 488 parallel port, IEEE 1394 (Firewire) port, Infrared Data Association (IrDA) port, etc.

Access points 211-213 and STB 214 include a management application 225 and personal computers (PC) 203 and 206, wireless telephones 204 and 207, television (TV) 205, and wireless headphones 208, include client assessment application 404 that allow these devices to implement the power management method and structure in accordance with an embodiment of the present invention. Further discussion of these wireless networks, access points, client devices, including methods for use therewith will be set forth in association with FIGS. 3-9 and the appended claims.

Figure 5:
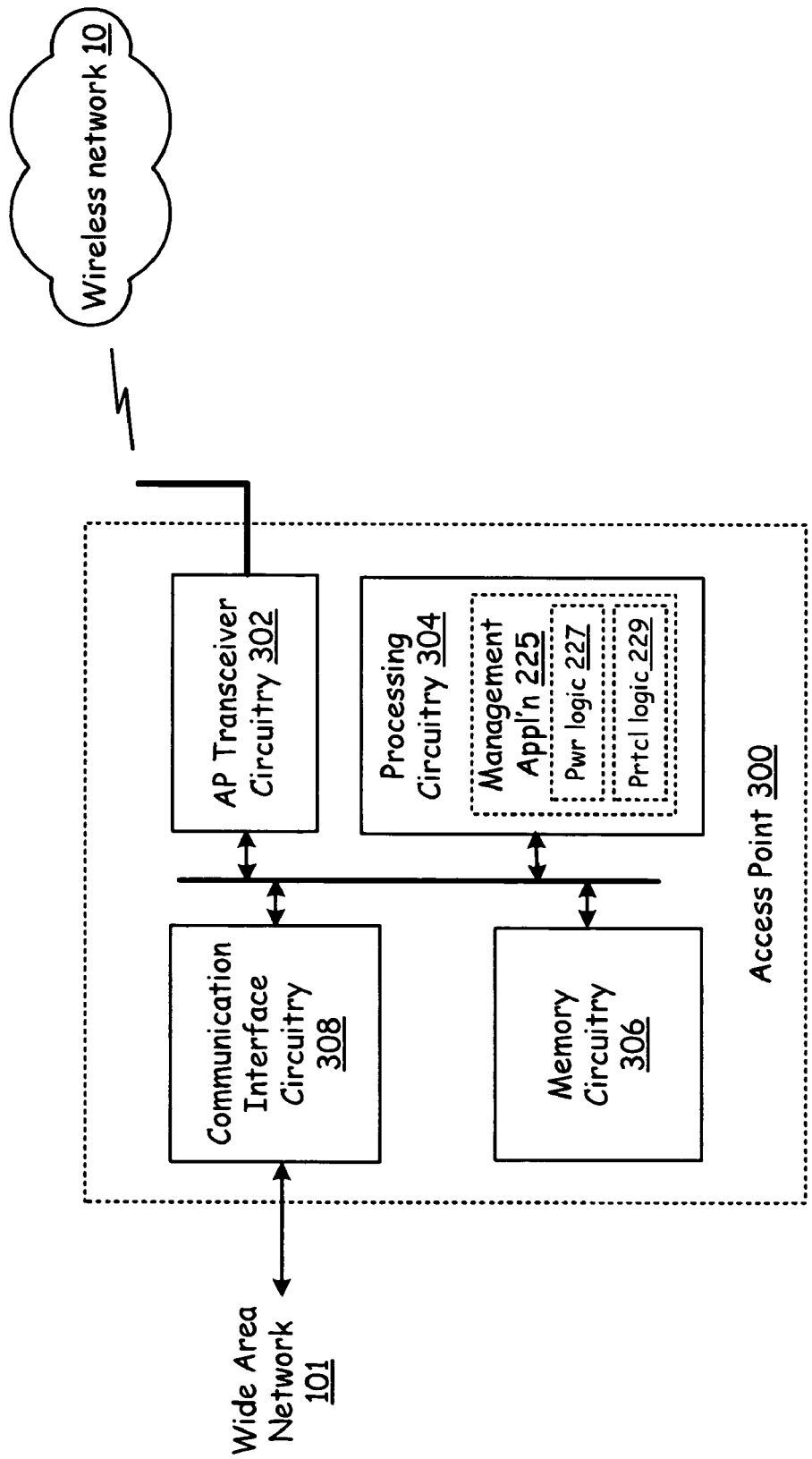
FIG. 5 presents a block diagram representation of an access point 300 that can be used in wireless network 10 in accordance with an embodiment of the present invention.

FIG. 5 presents a block diagram representation of an access point 300 that can be used in wireless network 10 in accordance with an embodiment of the present invention. In particular, access point 300, such as access point 110, 211-213, STB 214, is presented. Access point 300 includes a communication interface circuitry 308 for communicating with at least one packet switched backbone network 101. While a single connection is shown, in an embodiment of access point 300, such as access point 213 and/or STB 214, communication interface circuitry 308 provides a plurality of interfaces that communicatively couples with packet switched backbone network 101, such as the various networks shown in association with FIG. 4.

Access point 300 further includes access point transceiver circuitry 302, operatively coupled to the communication interface circuitry 308, that manages communication by transmitting at a plurality of power levels and receives data over a wireless network 10, to and from a plurality of client devices, such as client devices 121, 123, 125, 127, PCs 203 and 206, wireless phones 204 and 207, TV 205 and wireless headphones 208. Access point 300 also includes memory circuitry 306, and processing circuitry 304 that controls communication flow between the communication interface circuitry 308 and the access point transceiver circuitry 302, and that implements management application 225. Management application 225 includes power logic 227 that selects the power level of the plurality of power levels for periodic transmissions such as beacons, the transmission of data packets and the transmission acknowledgements, based on the particular target or targets that access point 300 wishes to reach with a particular transmission. In addition, management application 229 includes protocol logic 229 that selects either particular protocol parameters, or particular protocols for use in communications with one or more of the client devices. These protocols, protocol parameters, client device power levels and transmission power levels for access point 300 are stored in memory circuitry 306 and retrieved by processing circuitry 304 as needed.

The processing circuitry 304 may be a single processing device or a plurality of processing devices. Such a processing device may be, for example, any one or more of a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The memory circuitry 306 may be a single memory device or a plurality of memory devices. Such a memory device may be read-only memory, random access memory, volatile memory, non-volatile memory, flash memory, static memory, dynamic memory, optical or magnetic storage, and/or any device that stores digital information. Note that when the processing circuitry 304 implements one or more of its functions via a state machine, logic circuitry, analog circuitry, and/or digital circuitry, the memory storing the corresponding operational instructions may be embedded in the circuitry comprising the state machine, logic circuit, analog circuit, and/or digital circuit.

In an embodiment of the present invention, wireless network 10 conforms to at least one industry standard communication protocol such as 802.11, 802.16, 802.15, Bluetooth, Advanced Mobile Phone Services (AMPS), Global System for Mobile Communication (GSM), and a General Packet Radio Service (GPRS). Other protocols, either standard or proprietary, may likewise be implemented within the scope of the present invention.

In operation, the management application 225 receives reception characteristics, status characteristics, mobility characteristics and utilization characteristics from at least one of the plurality of client devices. The reception characteristics includes, for example, point to point reception parameters such as the strength of signals received by at least one of the plurality of client devices from other devices over the wireless link. Based on at least some of the reception characteristics, status characteristics, mobility characteristics and utilization characteristics, the management application 225 selects transmission power levels for itself and for each of the plurality of client devices, and transmits corresponding control signals to the plurality of client devices, directing transmission power adjustment to the selected power levels.

In addition, the protocol or protocol parameters used in communicating between devices of the wireless network are adapted by management application 225 to the particular characteristics of the access point and the client devices. In one mode of operation, the protocol logic can selectively adjust one or more protocol parameters, such as the packet length, data rate, forward error correction, error detection, coding scheme, data payload length, contention period, and back-off parameters used in communication between devices, based on the analysis of information, such as the reception characteristics, status characteristics, utilization characteristics, and mobility characteristics of these devices. In this fashion, the protocol parameters can optionally be adapted based on the conditions of the network, including not only the mobility, utilization, status, and reception characteristics of a particular device, but the mobility, utilization, status, and reception characteristics of a plurality of devices, including how well each device receives transmissions from other devices.

In one mode of operation, the processing circuitry 304 assesses characteristics from a plurality of client devices, based on the assessment detects existing and anticipates future hidden terminal conditions. The protocol logic 229 selects a first protocol parameter for transmissions by the transceiver circuitry 304 to a first client transceiver when the hidden terminal condition or potential hidden terminal condition is detected. In addition, the protocol logic 229, when the existing or potential hidden terminal condition is detected, selects a second protocol parameter for transmissions by the first client transceiver to the transceiver circuitry 304 and sends the second protocol parameter to the first client transceiver with a command for the first client transceiver to implement the second protocol parameter. In addition, the protocol logic 229, when the existing or potential hidden terminal condition is detected, selects a third protocol parameter for transmissions by transceiver circuitry 302 to the first client transceiver, the third protocol parameter differing from the second protocol parameter. These protocol parameters can be of different kinds, for instance, the protocol parameters can include parameters such as an error correcting code parameter, a packet length parameter, a data payload length, and a contention parameter, data rate, an error detection parameter, coding scheme, and back-off parameters used in communication between devices, etc.

Figure 8:
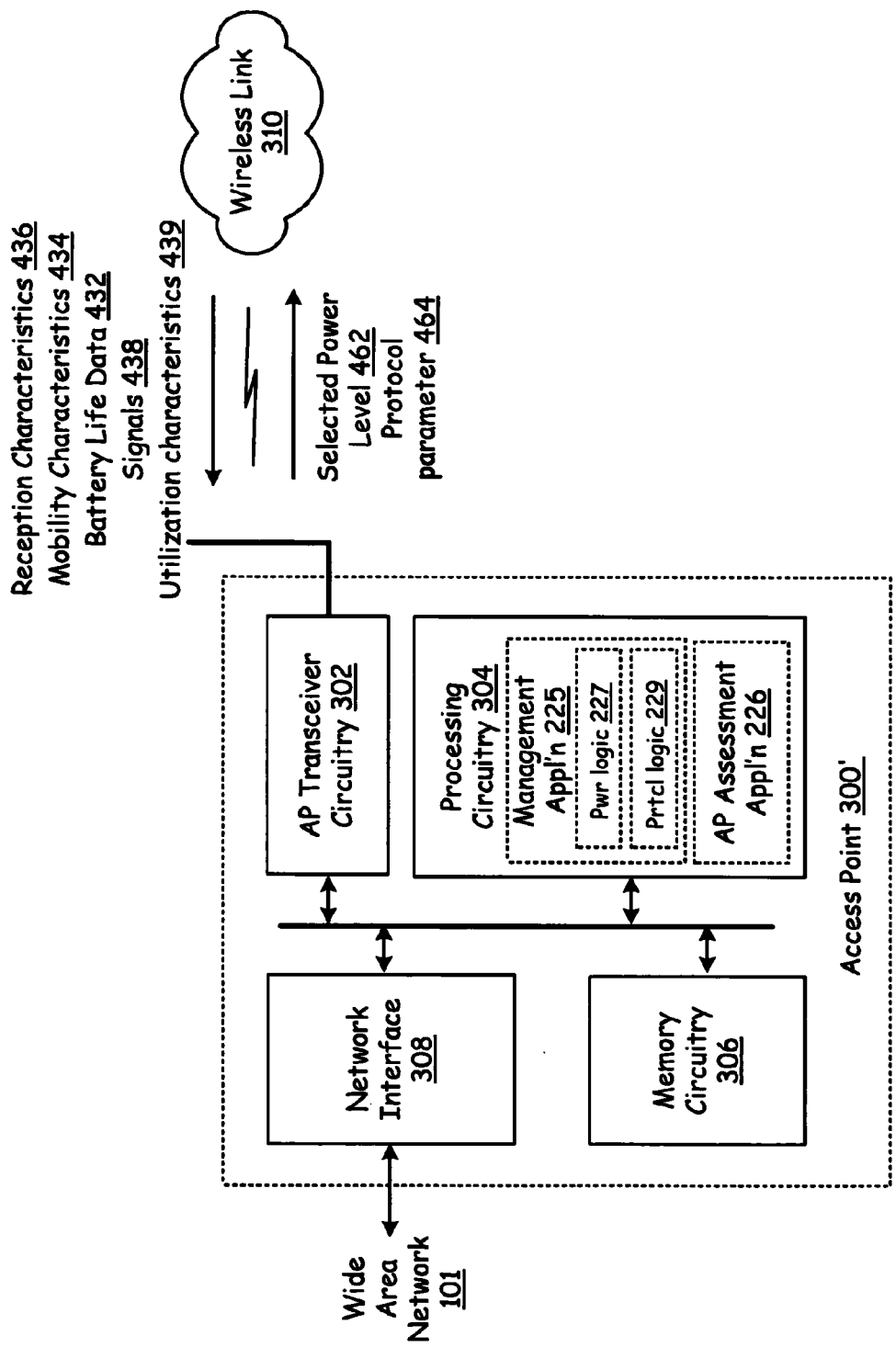
FIG. 8 presents a block diagram representation of an access point 300' with optional AP assessment application 225 in accordance with an embodiment of the present invention.

Further details, including several optional features of management application 225 are presented in association with FIG. 8.

Communication interface circuitry 308 and selected functions of AP transceiver circuitry 302 can be implemented in hardware, firmware or software. Other functions of transceiver circuitry 302 are implemented in analog RF (Radio Frequency) circuitry as will be understood by one skilled in the art when presented the disclosure herein. When implemented in software, the operational instructions used to implement the functions and features of these devices can also be implemented on processing circuitry 304 and stored in memory circuitry 306.

In operation, access point 300 communicates with each client device in a point-to-point manner. To transmit data, access point 300 generates a data packet that is formatted based the selected protocol of wireless network 10. In particular, communication interface circuitry 308 produces data payloads based on data received from packet switched backbone network 101. Other control information and data including the selected power levels and protocol parameters destined for the client devices of wireless network 10 are derived from power the management application 225 of the processing circuitry 304.

AP transceiver circuitry 302 modulates the data, up-converts the modulated data to produce an RF signal of the wireless network 10. In an embodiment of the present invention, the AP transceiver circuitry 302 transmits at one of a plurality of power levels, as determined by management application 225. As one of average skill in the art will appreciate, if the access point 300 operates based on a carrier sense multiple access with collision avoidance (CSMA/CA), when access point 300 transmits data, each client device in communication with wireless network 10 may receive the RF signal, but only the client that is addressed, i.e., a target client device, will process the RF signal to recapture the packet.

AP transceiver circuitry 302 is further operable to receive signals from the plurality of client devices over wireless network 10. In this instance, transceiver circuitry 302 receives an RF signal, down-converts the RF signal to a base-band signal and demodulates the base-band signal to recapture a packet of data. In particular, data payloads destined for packet switched backbone network 101 are provided to communication interface circuitry 308 to be formatted in accordance with the protocol used by packet switched backbone network 101. Other control information and data including the selected reception characteristics received from the client devices of wireless network 10 are provided to management application 225 of processing circuitry 304.

Figure 6:
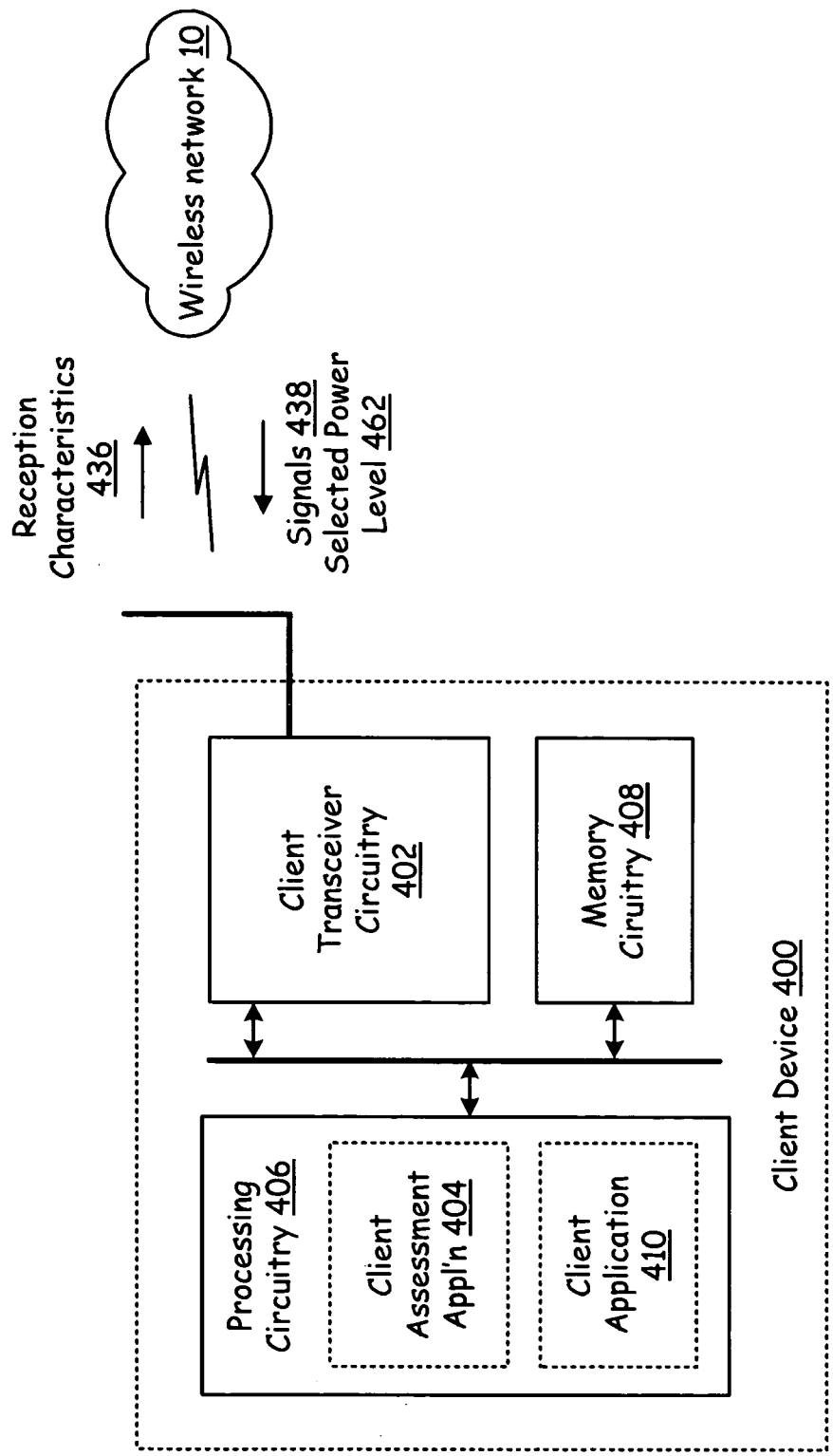
FIG. 6 presents a block diagram representation of a client device 400 that can be used in wireless network 10 in accordance with an embodiment of the present invention.

FIG. 6 presents a block diagram representation of a client device 400 that can be used in wireless network 10 in accordance with an embodiment of the present invention. A client device 400 is presented, such as client devices 121, 123, 125, 127, PCs 203 and 206, wireless phones 204 and 207, TV 205 and wireless headphones 208. In particular, client device 400 includes a client transceiver circuitry 402 that transmits and receives data over wireless network 10, that operates in a similar fashion to access point transceiver circuitry 402. However, client transceiver circuitry 402 is operable to transmit at a selected power level, received from access point 300.

Client device 400 includes memory circuitry 408, and processing circuitry 406 that implements client assessment application 404 and client application 410. The processing circuitry 406 may be a single processing device or a plurality of processing devices. Such a processing device may be a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The memory circuitry 408 may be a single memory device or a plurality of memory devices. Such a memory device may be read-only memory, random access memory, volatile memory, non-volatile memory, flash memory, static memory, dynamic memory, and/or any device that stores digital information. Note that when the processing circuitry 406 implements one or more of its functions via a state machine, logic circuitry, analog circuitry, and/or digital circuitry, the memory storing the corresponding operational instruction will be embedded in the circuitry comprising the state machine, logic circuit, analog circuit, and/or digital circuit.

Further, client device 400 includes a client assessment application 404, operably coupled to the client transceiver circuitry 402, that assesses signals received from other devices, including the access point and other client devices, over the wireless network 10. In response, client assessment application 404 generates reception characteristics and transmits the reception characteristics over the wireless link to access point 300.

In operation, the client assessment application 404 includes operational instructions that cause processing circuitry 406 to transfer data and signals to and from client transceiver circuitry 402; to assess signals 438 received from other devices, including other client devices, over the wireless link; and to generate reception characteristics 436. In one mode of operation, client assessment application calculates a measure of signal strength, such as RSSI for each of the other devices and formats this information as reception characteristics 436 for transmission to management application 225. Further details, including several optional features of client assessment application 404 are presented in association with FIG. 7.

Client application 410 includes the prime functions of the device itself, (e.g. a television, telephones, personal computer, headphones, etc.) Selected data packets transmitted to and wide area network originate 101 from data received from client application 410. In addition, data packets received from packet switched backbone network 101 are passed to client application 410.

Selected functions of client transceiver circuitry 402 can be implemented in hardware, firmware or software. Other functions of client transceiver circuitry 402 are implemented in analog RF circuitry as will be understood by one skilled in the art when presented the disclosure herein. When implemented in software, the operation instructions used to implement the functions and features of these devices can be implemented on processing circuitry 406 and stored in memory circuitry 408.

In an embodiment of the present invention, one or more components of client transceiver circuitry 402, processing circuitry 406 and memory circuitry 408 are implemented on an integrated circuit.

In operation, when client device 400 is scanning to associate with a new wireless network, such as wireless network 10, client device 400 detects either a beacon transmission and/or non-beacon transmissions such as other data, network management or control transmissions of an access point, such as access point 300, that are received by client transceiver circuitry 402. Client device 400 responds to the detection by determining the timing of the transmission and sends an association request transmission to the access point transceiver circuitry to initiate an association with the access point to couple the client device 400 to the packet switched backbone network 101 via the access point. While these non-beacon frames or packets may be addressed to other client devices, the client device 400 can detect these packets or frames for the limited purposes of determining the timing, protocol or rate of these transmissions, determining the received power level and identifying other information pertaining to the network, such as the SSID, that is sufficient to produce an association request to be transmitted to the access point to initiate an association therewith.

Figure 7:
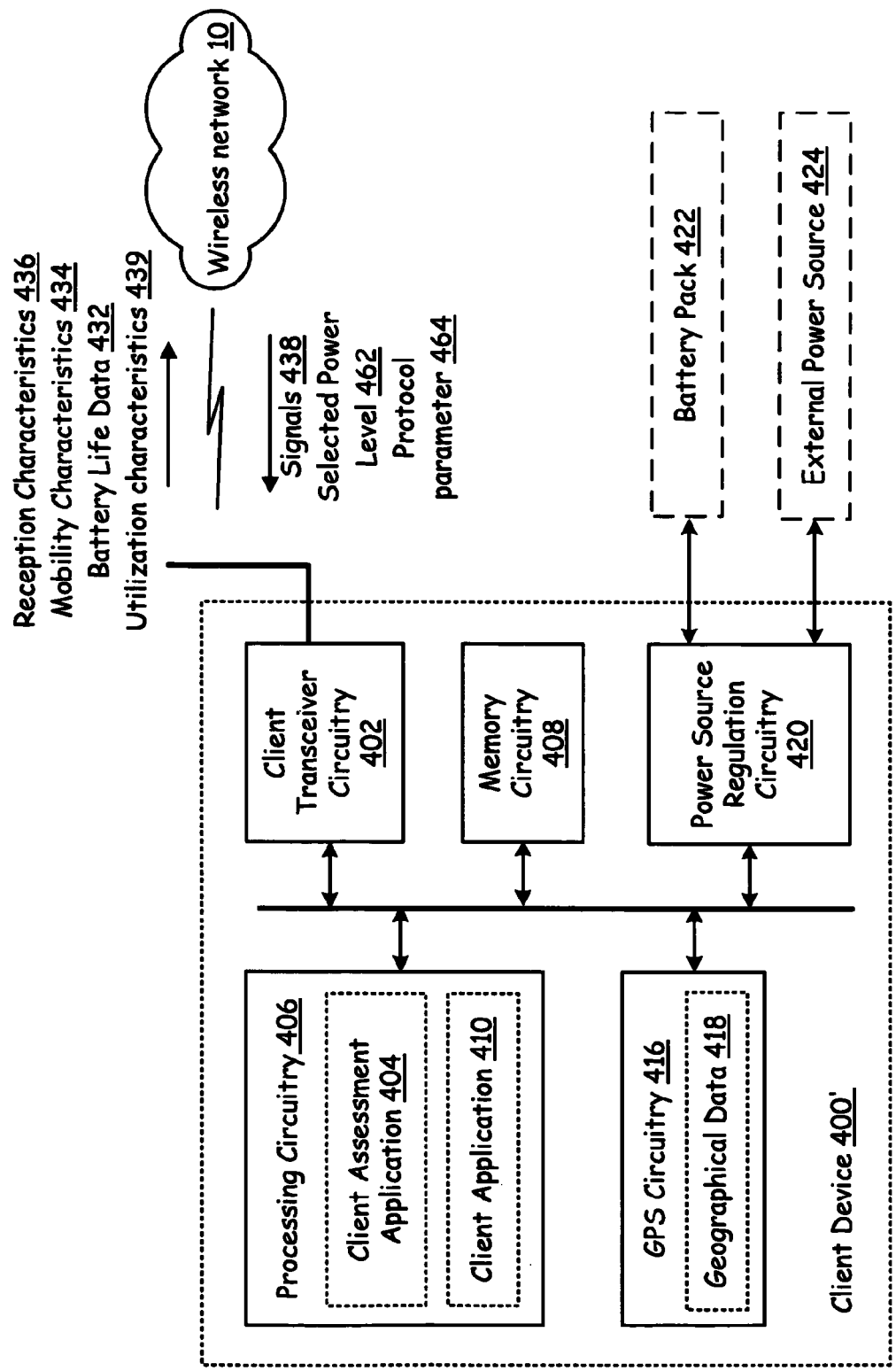
FIG. 7 presents a block diagram representation of a client device 400' with optional GPS circuitry 416 and power source regulation circuitry 420 in accordance with an embodiment of the present invention.

FIG. 7 presents a block diagram representation of a client device 400' with optional GPS circuitry 416 and power source regulation circuitry 420 in accordance with an embodiment of the present invention. Client device 400' can be used in place of client device 400 in any of the applications disclosed herein. In particular, a client assessment application 404 includes operational instructions that cause processing circuitry 406 to support the management application 225 of the access point 300. In particular, the client assessment application 404 is operably coupled to power source regulation circuitry 420 to monitor the charging of optional battery pack 422, monitor the charge used by battery pack 422, to determine the remaining charge on battery pack 422 and whether the optional external power source 424 is currently connected.

The client assessment application 404 includes operational instructions that cause processing circuitry 406 to generate battery life data 432 and transmit such status characteristics over the wireless network 10 via client transceiver circuitry 402. In one mode of operation, client assessment application 404 generates and transmits further status characteristics such as estimated remaining battery life. For instance, battery life data 432 can indicate the client device 400' is coupled to external power source 424, an estimated battery life for one or more selected power levels, an estimated battery life for one or more coding schemes, an estimated battery life battery life for one or more possible data rates, an estimated battery life based on an estimated channel usage, an estimated battery life battery life based on an estimate of required deterministic bandwidth, and an estimated battery life based on an estimate of non-deterministic bandwidth, or other estimates of battery life based on further operational parameters of client device 400'. Also as mentioned previously, other types of status characteristics can be generated pursuant to the client assessment application 404 and communicated to the management application running on the access point device 110.

Utilization characteristics can be similarly collected and communicated. For example, utilization characteristics may be retrieved directly from the current client application(s) or from the memory 408. Utilization characteristics retrieved from the memory may have originated, for example, based on: 1) prior interaction with or monitoring of the client application 410; 2) user input; and 3) preset values.

The client assessment application 404 also causes the processing circuitry 406 to generate and transmit mobility characteristics 434 over the wireless link 434 via the client transceiver circuitry 402. GPS module 416 provides geographical data 418 such as GPS coordinates, scalar and/or vector velocities, accelerations, etc. In addition to such geographical coordinate data 418, mobility module can generate mobility characteristics 434 that includes a mobility factor indicative of whether the client device is in a stationary condition, the client device is in a low mobility condition such as a laptop computer that shifts slightly on a table in a coffee shop, or whether the client device is in a high mobility condition, such as in a car or other mobile environment. This additional mobility characteristics 434 can be associated with a type of a device, e.g. a laptop computer may have a low mobility rating, a wireless transceiver circuitry mounted in a vehicle may have a medium mobility rating, a desktop computer may have a stationary mobility rating, etc. Further the mobility factor can be user selected based on the particular conditions. In addition, the mobility factor can be derived based on assessing a scalar or vector velocity from GPS module 416 and/or changes in geographical coordinate data 418 over time, and comparing the velocity to one of a plurality of mobility thresholds.

When generated and transmitted to management application 225, battery life data 432, utilization characteristics 439, mobility characteristics 434, and other status characteristics can further be used by management application 225 for determining a selected power level for client device 400', for access point 300, and for other client devices of wireless network 10, and for determining either a particular protocol or protocol parameters used by client device 400' in communications with access point 300. When received, selected power level 462 and protocol parameter 464 can be used to generate the transmissions by client device 400' to access point 300.

FIG. 8 presents a block diagram representation of an access point 300' with optional AP assessment application 225 in accordance with an embodiment of the present invention. An access point 300' is presented that includes many common elements of access point 300, referred to by common reference numerals. In addition, the access point 300' includes an AP assessment application 226 that includes operational instructions, that cause the processing circuitry 304 to assess signals 438 received from the plurality of client devices, such as client device 400, over the wireless network 10. The assessed strength of signals 438 can also be used by management application 225 to determine the selected power level the plurality of client devices of wireless network 10. Access point 300' may be used in any of the applications discussed in conjunction with access point 300.

In particular, access point assessment application 226 assesses signals 438 received from the plurality of client devices based upon a signal strength criteria such as RSSI, a signal to noise ratio (SNR), a noise parameter, or an amount of bit errors, and a bit error rate (BER) of data received from the particular client device.

In a test mode of operation, the access point assessment application 226 is operable to generate a test packet such as an echo packet that is transmitted to the client device where a reply packet is transmitted and received back by access point 300. The number of bit errors or the BER for this particular packet can be calculated by comparing the received data to the data that was transmitted. All other client devices that do not participate in the exchange, listen and generate reception characteristics for the access point assessment application 226.

In a further "sniffing" mode of operation, the access point assessment application 226 receives reception characteristics generated by the various client devices based on normal, ongoing packets exchanges with the access point. For example, reception characteristics might comprise an error detecting code such as a linear block code, convolutional code or error correcting code can be used to determine the number of bit errors in the received data, within the coding limit of the particular code use. For instance, a (24,12) Golay code with optional CRC bit could detect up to 4 errors in a 24 bit coded word before the coding limit was reached.

The management application 225 assesses the received reception characteristics 436, mobility characteristics 434, utilization characteristics 439 and battery life data 432. Optional assessed strength of signals are received from access point assessment application 226. Although not shown, other types of status characteristics and are also received and assessed by the management application 225.

The management application 225 implements a plurality of power management rules, based on the reception characteristics 436 (including the assessed strength of signals), the mobility characteristics 434, utilization characteristics, battery life data 432 and other status characteristics. The power management rules generate a selected power level to be used by the access point 300 and a selected power level 462 to be used by one, all or a group of ones of a plurality of client devices, such as client device 400. Upon receiving a corresponding control instruction from the management application 225, any such client device responds adjusting the transmission power to that selected.

In operation, the access point 300', through transceiver circuitry 302, is capable of transmitting at a selected power level that is based on factors such as the type of transmission, the reception characteristics, status characteristics, utilization characteristics, mobility characteristics, and the particular target device for the transmission. For instance, access point 300' can transmit periodic beacons at a high power level that include information relating to the access point 300' and the packet switched backbone network 101 such as a service set identifier (SSID) that identifies the network, a beacon interval that identifies the time between the periodic beacon transmissions, a time stamp that indicates the time of the transmission, transmission rates that are supported by the access point 300', parameters sets pertaining to specific signaling methods such as channel number, hopping pattern, frequency hop dwell time etc., capability information relating to the requirements that client devices need to associate with the access point 300' such as encryption and other privacy information, a traffic indication map that identifies stations in power saving mode, and/or other control information and data. These beacons are used to support new associations with client devices such as the client devices 121, 123, 125 127, 400 and/or 400' that enter the proximity of access point 300' or that otherwise become active within this proximity. In particular, these beacon signals are sent with an address field, such as a universal address, that addresses the beacon transmission to all client devices. A client device that wishes to associate (or reassociate) with the wireless network 10, detects the beacon transmission and responds with an association response transmission, including the SSID, that begins the association (or reassociation) process between the new client device and the access point 300'.

Access point 300' is further operable to transmit other network control and management information, such as association responses, reassociation responses, probe responses, clear to send signals, acknowledgements, power-save polls, contention-free end signals, and/or other information or data in packets or frames at reduced power levels in order to limit interference with neighboring networks, conserve power, etc. However, one or more other transmissions of access point 300' are sent between beacon transmissions at a higher power level to: 1) support associations or reassociations; 2) communicate channel busy indications; and 3) deliver channel other network information, such as pending message information, timing information, channel parameter information, etc. While these frames or packets may be addressed to other client devices, a client device scanning to associate with a new wireless network, such as wireless network 10, can detect these packets or frames for the limited purposes of determining the timing, protocol or rate of these transmissions, determining the received power level and identifying other information pertaining to the network, such as the SSID, that is sufficient to produce an association request. In this fashion, for example: 1) new associations can be supported at a frequency that is greater than the frequency of the periodic beacon transmissions; 2) pending messages can be detected and requested without having to wait for the next beacon; 3) hidden terminal problems caused by lower power transmissions can be mitigated; and 4) channel parameter adjustments can be made more rapidly.

For example, the access point processing circuitry 304 can assess both a first plurality of characteristics and a second plurality of characteristics received from two client devices associated therewith, and based on the assessment, select a second power level of the plurality of power levels for a first transmission of data packets by the access point transceiver circuitry 302, addressed to a first of the two client devices, and the first power level of the plurality of power levels for a second transmission by the access point transceiver circuitry 302, also addressed to the first of the two client devices, and the first power level is greater that the second power level. The first transmission can include data packets from the packet switched backbone network and the second transmission can include acknowledgement data that is based on data packets received by the access point transceiver circuitry 302 from the first client transceiver circuitry. Alternatively, the first transmission and the second transmission can both include data packets from the packet switched backbone network 101. Further, the first transmissions and the second transmissions can both includes acknowledgement data that is based on data packets received by the access point transceiver circuitry 302 from the first client transceiver circuitry. Based on these transmissions a third client device having third client transceiver circuitry that detects the second transmission, responds to the detection by determining the timing of the transmission and sends an association request transmission to the access point transceiver circuitry 302 to initiate an association with access point 300' to couple the third client device to the packet switched backbone network 101 via the access point transceiver circuitry 302, the access point processing circuitry 304, and the communication interface circuitry 300. In addition, the access point processing circuitry 304 can select a third power level of the plurality of power levels for third transmissions by the access point transceiver circuitry 302 to the second client transceiver circuitry and the first power level of the plurality of power levels for fourth transmissions by the access point transceiver circuitry to the second client transceiver circuitry, and the first power level is greater than the second power level that is greater that the third power level.

The selection of the particular intermediate transmissions by access point 300', that are between the periodic beacons and are sent at a high power level to support association by a client device, can be performed in several ways. For instance, transmissions of a particular type, such as the transmission of data packets or frames, acknowledgement packets or frames, or other types of control or management packets or frames can alternate between N transmissions at the reduced power level and M transmissions at the higher level, where N and M are integers that are greater than zero. For instance, 1 of 2, 1 of 3, 1 of 4, 1 of 6, or 1 of 16, etc., data frames or packets can be sent at the high power level with the other packets sent at the reduced power level. Or for instance, 1 of 2, 1 of 3, 1 of 4, 1 of 6, or 1 of 16, etc., acknowledgement frames or packets can be sent at the high power level with the other packets sent at the reduced power level. Alternatively, the access point 300' can keep track of the timing between beacons to identify one or more periodic high-power transmission windows, such as midway between these beacons or equally spaced between these beacons. Transmissions of data, control or management packets or frames that occur during these high-power transmission windows are automatically transmitted at the high power level.

Reduced power levels are determined based on reception characteristics relating to how well the client devices, such as the client devices 121, 123, 125, 127, 400 and/or 400' receive these beacon transmissions can be generated by the client assessment applications 404 of these client devices and transmitted back to the access point 300'. The response by the management application 225 depends on the reception characteristics received from the client 121, 123, 125, 127, 400' and/or 400'. For example, the management application 225 may decide to select a customized power level for the access point to transmit to each of the client devices 121, 123, 125, 127, 400' and/or 400' that may be reduced from the maximum power output, but that provides sufficient power to be received by that particular client device. The management application 225 also selects a high or intermediate power level that is sufficient to be received by all of the client devices 121, 123, 125, 127, 400' and/or 400'. Specific packets, such as all acknowledgements (ACKs), every other ACK, every nth ACK etc., all data packets, occasional data packets, etc. are transmitted by the access point 300' at the high or intermediate power level that will reach all of the client devices 121, 123, 125, 127, 400' and/or 400', with the remaining packets transmitted at the power level that is customized for the particular client device 121, 123, 125, 127, 400' and/or 400' to which the packets are addressed. Alternatively, the management application 225 may decide to select a lower power level for transmissions by the access point 300' that will reach the client devices 121, 123 and 127, but not the client device 125. For transmissions to the client device 125, a higher power level will be selected. In addition, periodic or occasional transmissions from the access point 300' will be sent at the higher power level even though they are not destined for the client device 125, and other periodic or occasional transmissions will be sent at the highest power level to support associations and so on. Many other variations are possible that involve selecting various power transmission levels for the access point 300', with such power levels being selected to reach one or more associated client devices, to reach all associated client devices, and to reach unassociated client devices.

Similarly, the management application 225 also determines the transmission power levels of the client devices 121, 123, 125, 127, 400' and/or 400'. It does this by retrieving information (e.g., reception characteristics) from each of the client devices regarding their ability to detect and receive transmissions from the client devices 121, 123, 125, 127, 400' and/or 400'. In the present embodiment, because no direct transmissions occur between the client devices 121, 123, 125, 127, 400' and/or 400', the retrieved information always relates to transmissions sent by the client devices 121, 123, 125, 127, 400' and/or 400' to the access point 300'. In other embodiments, the transmissions may in fact be direct. Regardless, from the retrieved information, the access point 300' delivers power control instructions to each of the client devices 121, 123, 125, 127, 400' and/or 400'. Such power control instructions may merely command that all transmissions occur at an identified, single power level. Alternatively, the power control instructions may indicate that a single client device use multiple different power levels in communicating with the access point 300'. For example, because transmissions from the client device 121 may be easily detected by all of the other client devices 123, 125 and 127 and the access point 300', the access point 300' commands that the client device 121 always transmit at a low power level that all network participants can detect. Because transmissions from the client device 121 cannot be easily detected by the client device 127, the access point 300' directs that the client device 121 normally transmit at a low power level with periodic or occasional transmissions at the highest power level. For example, the highest power level transmissions might be every third data packet and/or every third acknowledgment packet. As before, many other variations are possible that involve selecting various power transmission levels for the client devices, with such power levels being selected to reach the access point 300' and to reach one or more other associated client devices, all associated client devices, and unassociated client devices.

By way of further example, the power level generation module can, through operation of the power management rules, determine which of the client devices 400 are not being heard by other client devices. In response, power level generation module can establish a selected power level 462 for such client devices 400 to optionally boost the transmission power so that they will be heard by some or all of the remaining client devices. In addition, power level generation module can reduce the power generated by a client device 400 that is generating a stronger than necessary signal for being heard by the remaining client devices.

Management application 225 is further operable to manage the protocol or protocols used in communicating between the access point 300' and the client devices associated with access point 300' over wireless network 10. In one mode of operation, management application 225 can selectively adjust one or more protocol parameters, such as the packet length, data rate, forward error correction, error detection, coding scheme, data payload length, contention period, and back-off parameters used by access point 300' in communication with one or more of the client devices 121, 123, 125, 127, 400 and/or 400' based on the analysis of the reception characteristics, status characteristics, utilization characteristics, and mobility characteristics. In this fashion, the protocol parameters can optionally be adapted based on the conditions of the network, including not only the mobility, utilization, status, and reception characteristics of a particular device, but the mobility, utilization, status, and reception characteristics of a plurality of other devices, including how well each client device receives other client devices.

For example, in the event that a first client device has difficulty detecting transmissions from a second client device, access point 300' can modify the protocol parameters so that transmissions by the second client device include more aggressive error correcting codes, increased back-off times and/or smaller data payloads or packet length to increase the chances that a packet will be received in the event of contention by the first client device. In addition, decreasing the packet length can increase the frequency of acknowledgements transmitted by access point 300'. These acknowledgements can be transmitted at a power level sufficient to be heard by the first client device. With increased back-off times, first client device is less likely to create a potential contention.

In a further mode of operation, access point 300' and its associated client devices can operate using a plurality of different, and potentially complimentary, protocols having different protocol parameters. Access point 300' can likewise adjust protocol parameters by selecting a particular one of a plurality of protocols that suits the particular conditions present in the wireless network 10, as determined based on an assessment of utilization characteristics, status characteristics, mobility characteristics and/or reception characteristics. For instance, an access point can select from 802.11(n), 802.11(g) or 802.11(b) protocols having different protocol parameters, data rates, etc, based on the particular protocol best suited to accommodate the characteristics of the client devices that are present.

In a mode of operation, an access point such as access point 300', manages communication exchanges between a plurality of wireless devices, such as client devices 121, 123, 125, 127, 400 and/or 400' and a packet switched backbone network 100, such that the plurality of wireless devices include a plurality of associated devices and at least one unassociated device. The access point includes interface circuitry, such as communication interface circuitry 308, that communicatively couples with the packet switched backbone network; wireless transceiver circuitry, such as AP transceiver circuitry 302, that supports transmissions at a plurality of power levels; processing circuitry, such as processing circuitry 304 that is communicatively coupled to both the interface circuitry and the wireless transceiver circuitry, that receives via the wireless transceiver circuitry information from each of the plurality of wireless devices, such information comprising at least reception information related to a transmission from the wireless transceiver circuitry. In operation, the processing circuitry makes a first selection from the plurality of power levels for periodic beacon transmissions by the wireless transceiver circuitry. The processing circuitry makes a second selection from the plurality of power levels for transmissions between the periodic beacon transmissions and by the wireless transceiver circuitry to the at least one unassociated device. The processing circuitry, based on at least part the information received via the wireless transceiver circuitry, makes at least a third selection from the plurality of power levels for transmissions by the wireless transceiver circuitry to the plurality of associated devices.

The third selection can include selecting a first transmission power level that reaches at least one of the plurality of associated devices but not at least one other of the plurality of associated devices, and selecting a second transmission power level that reaches the at least one other of the plurality of associated devices. The first selection and the second selection can correspond to a first power level, the third selection can correspond to a second power level, with the second power level being less than the first power level. The third selection can include a selection from the plurality of power levels for transmissions by the wireless transceiver circuitry that cannot be adequately received by at least one of the plurality of associated devices; and a fourth selection can include a selection from the plurality of power levels for transmissions by the wireless transceiver circuitry to the at least one of the plurality of associated devices that cannot adequately receive transmissions pursuant to the third selection.

In another mode of operation, an access point, such as access point 300', manages communication exchanges between a plurality of wireless devices, such as client devices 121, 123, 125, 127, 400 and/or 400', and a packet switched backbone network 101. The access point includes interface circuitry, such as communication interface circuitry 308, that communicatively couples with the packet switched backbone network 101; wireless transceiver circuitry, such as AP transceiver circuitry 302; processing circuitry, such as processing circuitry 304, that is communicatively coupled to both the interface circuitry and the wireless transceiver circuitry, that receives via the wireless transceiver circuitry information from each of the plurality of wireless devices, such information comprising at least reception information related to transmissions from the wireless transceiver circuitry and from others of the plurality of wireless devices. In operation, the processing circuitry directs transmission of periodic beacons via the wireless transceiver circuitry. The processing circuitry, based on at least part the information received via the wireless transceiver circuitry, sends a first instruction identifying a plurality of transmission power levels for transmissions from each of at least one of the plurality of wireless devices. The processing circuitry, based on at least part the information received via the wireless transceiver circuitry, sends a second instruction identifying at least one transmission power level for transmissions from each of at least one other of the plurality of wireless devices.

The first instruction can identify a first of the plurality of transmission power levels for transmission of a first type, and a second of the plurality of transmissions for transmissions of a second type. Also, the first instruction can identify a first of the plurality of transmission power levels for some transmissions, and a second of the plurality of transmissions for other transmissions. The plurality of transmission power levels can include a first transmission power level capable of reaching all of the plurality of wireless devices; and a second transmission power level incapable of reaching all of the plurality of wireless devices. The processing circuitry, based on at least part the information received via the wireless transceiver circuitry, can select a plurality of access point transmission power levels for the wireless transceiver circuitry.

In an embodiment of the present invention, one or more components of communication interface circuitry 308, access point transceiver circuitry 302, memory circuitry 306 and processing circuitry 304 are implemented on an integrated circuit.

Figure 9:
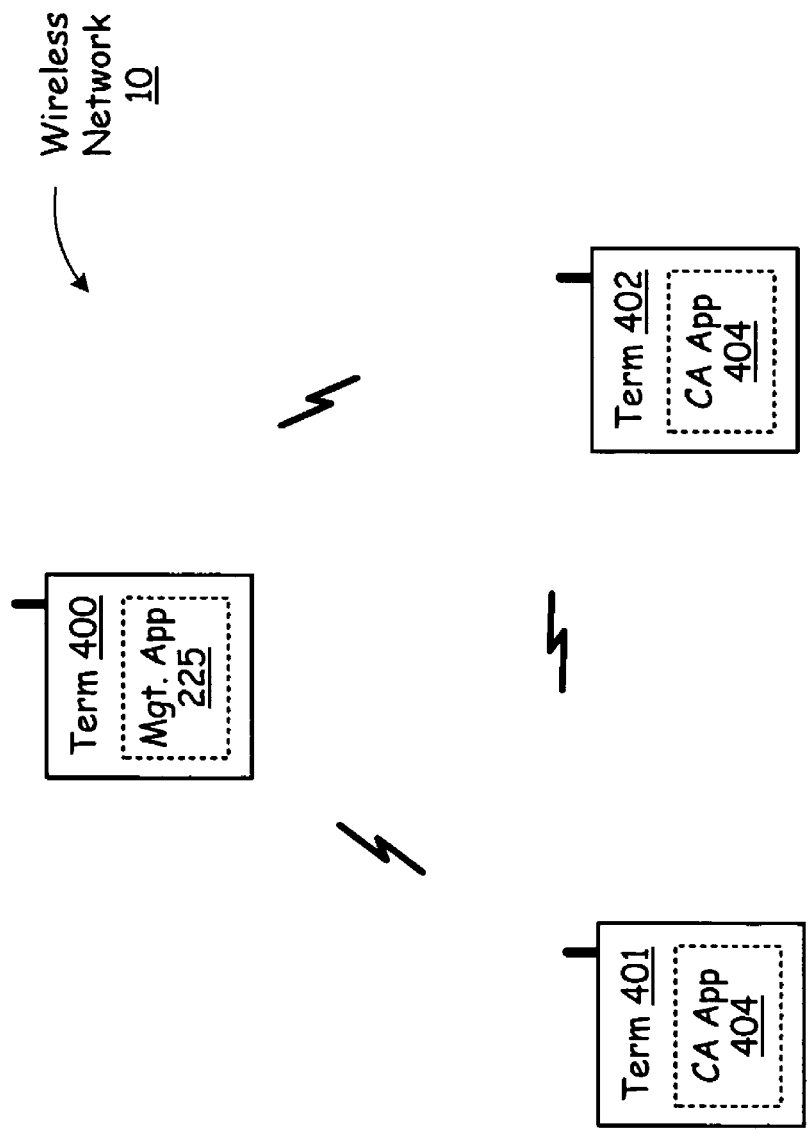
FIG. 9 presents a pictorial representation of a wireless network 10 in accordance with an embodiment of the present invention that provides a management application 225 in one of a plurality of terminals.

FIG. 9 presents a pictorial representation of a wireless network 10 in accordance with an embodiment of the present invention that provides a management application 225 in one of a plurality of terminals. A wireless network 10 includes terminals 400, 401 and 402 that are each capable of sending and receiving data from the other terminals over a wireless link.

Terminal 400 includes a management application 225 and terminals 400 and 402 include a client assessment application 404 that allows the selection of transmit power levels to promote effective communication, while reducing the power consumption of terminals. Each of the terminals 400, 401 and 402 are operable to assess the signals received from other devices over the wireless link. Terminals 401 and 402 generate data such as reception characteristics based on the assessed signals, battery life data based on estimates of power consumption, and other status, utilization and mobility characteristics based indicating how likely the signal strengths for a particular terminal may change due to movement, how it is being used and its other anticipated current, estimated or anticipated conditions.

Terminals 401 and 402 transmit these data over the wireless link to terminal 400. Terminal 400, determines a selected power level and particular protocols or protocol parameters for itself and for each other terminal, based on the data that it receives for each device, and transmits the selected power levels and protocol parameter(s) back to each corresponding device. The terminals 401 and 402 can then transmit at a power level and with a protocol that takes advantage of their particular circumstances, including their status in the overall wireless network 10, and based on the positions and properties of the other terminals that are present.

In operation, terminal 400, while not performing the specific functions of an access point, is capable of performing other features and functions of either access point 300 or access point 300' discussed herein. In addition, terminals 401, while not necessarily performing the functions of a client application, are capable of performing other features and functions of either client device 400 or client device 400' discussed herein.

In another mode, all parameters are exchanged between every wireless terminal and the access point so that each can independently or cooperatively make transmission power control decisions.

For instance, a communication network such as wireless network 10 can include a first device such as terminal 400, having a first wireless transceiver that transmits at a plurality of power levels, a second device, such as terminal 401 having a second wireless transceiver, and a third device, such as terminal 402 having a third wireless transceiver. The second device generates a first reception characteristic based on at least one transmission from the third wireless transceiver, and the second device transmits the first reception characteristic to the first wireless transceiver of the first device. The third device generates a second reception characteristic based on at least one transmission from the second wireless transceiver, and the third device transmits the second reception characteristic to the first wireless transceiver of the first device. The transmission from the third wireless transceiver can comprises either a portion of an ongoing data exchange or a portion of a test message.

The first device, based on the first reception characteristic, selects a first power level of the plurality of power levels for transmissions by the first transceiver circuitry to the third transceiver circuitry. The first device, based on the second reception characteristic, selects a second power level of the plurality of power levels for transmissions by the first transceiver circuitry to the second transceiver circuitry, and the first power level is greater than the second power level.

In another mode of operation, the first device is further operable to select the first power level of the plurality of power levels for third transmissions by the first transceiver circuitry to the third transceiver circuitry, and selects a third power level of the plurality of power levels for fourth transmissions by the first transceiver circuitry to the third transceiver circuitry, and the first power level is greater than the third power level. The first transmissions can include data packets and the second transmissions can include acknowledgement data that is based on data packets received by the first device from the second device. Alternatively, the first transmissions and the second transmission both includes acknowledgement data that is based on data packets received by the first device from the second device. Further, the first device circuitry can alternates between N first transmissions and M second transmissions, and N and M are both integers that are greater than zero.

In a further mode, the second and third devices transmit mobility characteristics, status characteristics, and utilization characteristics to the first device. The first device assesses at least a portion of the mobility, status and utilization characteristics along with the reception characteristic to generate the power levels for itself and for the second and third devices and for the protocol parameters used by these devices to format transmissions that are sent and to decode transmissions that are received. In particular, the first device, based on the received characteristics, selects a first protocol parameter for transmissions by the first device to the third device. The first device, based on the received characteristics, selects a second protocol parameter for transmissions by the first device to the second device, wherein the first protocol parameter can be either the same or different from the second protocol parameter. The first device can be further operable to select a third protocol parameter for transmissions by the second device to the first device and send the third protocol parameter to the second device and to select a fourth protocol parameter for transmissions by the third device to the first device and send the fourth protocol parameter to the third device, such that the third protocol parameter differs from the fourth protocol parameter.

In addition, the characteristics are assessed by the first device to detect the presence of an existing or potential hidden terminal condition between the second device and the third device. Protocol parameters and/or power levels are selected in the event that the hidden terminal condition is detected. These protocol parameters can be of different kinds, for instance, the protocol parameters can include parameters such as an error correcting code parameter, a packet length parameter, a data payload length, and a contention parameter, data rate, an error detection parameter, coding scheme, and back-off parameters used in communication between devices, etc.

Figure 10:
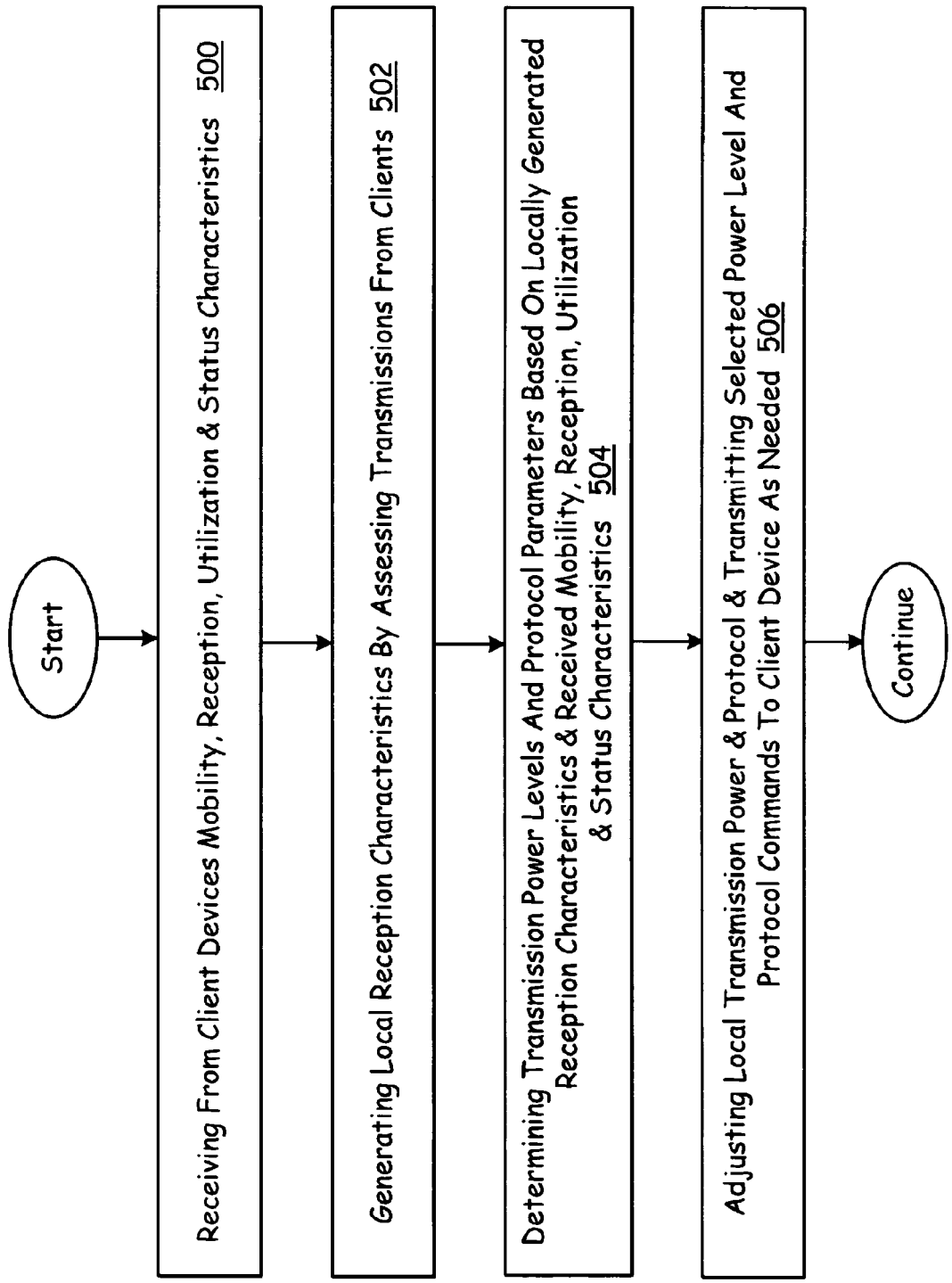
FIG. 10 presents a flowchart representation of a method that can be used in a terminal, access point and/or an integrated circuit in accordance with an embodiment of the present invention.

FIG. 10 presents a flowchart representation of a method that can be used in a terminal, access point and/or an integrated circuit in accordance with an embodiment of the present invention. In particular, a method is presented for use in conjunction with one or more features and functions presented in association with FIGS. 1-9. In step 500, a first power level is selected for periodic beacon transmissions. In step 500, reception characteristics, mobility characteristics, utilization characteristics, and status characteristics are received from one or more client devices over a wireless link. In step 502, the signals received from one or more client devices over the wireless link are assessed and local reception characteristics is generated. Such signals are either test signals or part of ongoing communication exchanges. In step 504, transmission power levels and protocol parameters are determined for each of the client devices and for local use based on any part or all of the locally generated reception characteristics and the received mobility, reception, utilization, and status characteristics. In step 506, the local transmission power and protocol is adjusted, if needed, and commands requesting transmission power and protocol adjustments are sent to each of the client devices as needed. This method is well suited for being implemented as operational instructions that are stored in a memory such as memory circuitry 306 and implemented using processing circuitry such as processing circuitry 304.

For example, the status characteristics related to battery life might indicate one or more of the following: whether the client device is coupled to an external power source; the battery life for at least one selected power level; the battery life for at least one coding scheme; the battery life for at least one data rate; the battery life based on an estimated channel usage; the battery life based on an estimate of required deterministic bandwidth; and the battery life based on an estimate of non-deterministic bandwidth. The mobility characteristics might indicate, for example, one or more of the following: the client device is in a stationary condition; the client device is in a low mobility condition; the client device is in a high mobility condition; and a geographical coordinate of the client device.

The reception characteristics such as the assessment signal strength might include, for example, one or more of: a received signal strength indicator (RSSI); a signal to noise ratio; a noise parameter; an amount of bit errors; and a bit error rate (BER). In one mode of operation, a test packet such as an echo packet is transmitted to the client device where a reply packet is transmitted and received back. The number of bit errors or the BER for this particular packet can be calculated by comparing the received data to the data that was transmitted.

In further mode of operation, received data is assessed based on the payload of normal packets that are received. For instance, an error detecting code such as a linear block code, convolutional code or error correcting code can be used to determine the number of bit errors in the received data, within the coding limit of the particular code use. For instance, a (24,12) Golay code with optional CRC bit could detect up to 4 errors in a 24 bit coded word before the coding limit was reached.

In one mode of operation, step 506 implements a plurality of power management rules, based on the reception characteristics, and optionally the mobility characteristics, battery life data and the assessed strength of signals. These power management rules generate a selected power level for an access point (including a client device that performs the functions of an access point), based on factors such the type of transmission, the reception characteristics, status characteristics, utilization characteristics, mobility characteristics, and the particular target device for the transmission. For instance, the access point can transmit periodic beacons at a high power level that include information relating to the access point and the packet switched backbone network such as a service set identifier (SSID) that identifies the network, a beacon interval that identifies the time between the periodic beacon transmissions, a time stamp that indicates the time of the transmission, transmission rates that are supported by the access point, parameters sets pertaining to specific signaling methods such as channel number, hopping pattern, frequency hop dwell time etc., capability information relating to the requirements that client devices need to associate with the access point such as encryption and other privacy information, a traffic indication map that identifies stations in power saving mode, and/or other control information and data. These beacons are used to support new associations with client devices that enter the proximity of the access point or that otherwise become active within this proximity. In particular, these beacon signals are sent with an address field, such as a universal address, that addresses the beacon transmission to all client devices. A client device that wishes to associate (or reassociate) with the wireless network, detects the beacon transmission and responds with an association response transmission, including the SSID, that begins the association (or reassociation) process between the new client device and the access point.

The access point is further operable to transmit other network control and management information, such as association responses, reassociation responses, probe responses, clear to send signals, acknowledgements, power-save polls, contention-free end signals, and/or other information or data in packets or frames at reduced power levels in order to limit interference with neighboring networks, conserve power, etc. However, one or more other transmissions of the access point are sent between beacon transmissions at a higher power level to support associations or reassociations by client devices that can only detect the higher power level. While these frames or packets may be addressed to other client devices, a client device scanning to associate with a new wireless network, such as wireless network, can detect these packets or frames for the limited purposes of determining the timing, protocol or rate of these transmissions, determining the received power level and identifying other information pertaining to the network, such as the SSID, that is sufficient to produce an association request. In this fashion, new associations can be supported at a frequency that is greater than the frequency of the periodic beacon transmissions.

For example, the access point processing circuitry can assess both a first plurality of characteristics and a second plurality of characteristics received from two client devices associated therewith, and based on the assessment, select a second power level of the plurality of power levels for a first transmission of data packets by the access point transceiver circuitry, addressed to a first of the two client devices, and the first power level of the plurality of power levels for a second transmission by the access point transceiver circuitry, also addressed to the first of the two client devices, and the first power level is greater that the second power level. The first transmission can include data packets from the packet switched backbone network and the second transmission can include acknowledgement data that is based on data packets received by the access point transceiver circuitry from the first client transceiver circuitry. Alternatively, the first transmission and the second transmission can both include data packets from the packet switched backbone network. Further, the first transmissions and the second transmissions can both includes acknowledgement data that is based on data packets received by the access point transceiver circuitry from the first client transceiver circuitry. Based on these transmissions a third client device having third client transceiver circuitry that detects the second transmission, responds to the detection by determining the timing of the transmission and sends an association request transmission to the access point transceiver circuitry to initiate an association with the access point to couple the third client device to the packet switched backbone network via the access point transceiver circuitry, the access point processing circuitry, and the communication interface circuitry. In addition, the access point processing circuitry can select a third power level of the plurality of power levels for third transmissions by the access point transceiver circuitry to the second client transceiver circuitry and the first power level of the plurality of power levels for fourth transmissions by the access point transceiver circuitry to the second client transceiver circuitry, and the first power level is greater than the second power level, that is greater that the third power level.

The selection of the particular intermediate transmissions by the access point, that are between the periodic beacons and are sent at a high power level to support association by a client device, can be performed in several ways. For instance, transmissions of a particular type, such as the transmission of data packets or frames, acknowledgement packets or frames, or other types of control or management packets or frames can alternate between N transmissions at the reduced power level and M transmissions at the higher level, where N and M are integers that are greater than zero. For instance, 1 of 2, 1 of 3, 1 of 4, 1 of 6, or 1 of 16, etc., data frames or packets can be sent at the high power level with the other packets sent at the reduced power level. Or for instance, 1 of 2, 1 of 3, 1 of 4, 1 of 6, or 1 of 16, etc., acknowledgement frames or packets can be sent at the high power level with the other packets sent at the reduced power level. Alternatively, the access point can keep track of the timing between beacons to identify one or more periodic high-power transmission windows, such as midway between these beacons or equally spaced between these beacons. Transmissions of data, control or management packets or frames that occur during these high-power transmission windows are automatically transmitted at the high power level.

Reduced power levels are determined based on reception characteristics relating to how well the client devices, such as the client devices receive these beacon transmissions can be generated by the client assessment applications of these client devices and transmitted back to the access point. In response, the management application determines a customized power level for the access point to transmit to each client device, that may be reduced from the maximum power output, but that provides sufficient power to be received by that particular client device. The management application determines a high or intermediate power level that is sufficient to be received by all of the client devices associated with the network. Specific packets, such as all acknowledgements (ACKs), every other ACK, every nth ACK etc., all data packets, occasional data packets, etc. are transmitted by the access point at the high or intermediate power level that will reach all of the associated client devices, with the remaining packets transmitted at the power level that is customized for the particular client device to which the packets are addressed.

In a further mode of operation, these power management rules establish a selected power level for a plurality of client devices, that are equipped to receive the selected power level and to set the selected power level accordingly. The selected power levels are transmitted to the corresponding client devices. The selected power level for each client device can be a discrete variable that takes on one of a finite number of values. For example, through operation of the power management rules, the method can determine which of the client devices are not being heard by other client devices. In response, a selected power level can be established for such client devices to optionally boost the transmission power so that they will be heard by some or all of the remaining client devices. In addition, power management rules can reduce the power generated by a client device that is generating a stronger than necessary signal for being heard by the remaining client devices.

In a further example, an analysis of reception characteristics and battery life data may reveal that a client device is easily detected by each of the other devices and that it is running low on battery power. In response, a reduced power level can be selected for that device to extend its battery life.

In another example, an analysis of reception characteristics and mobility characteristics may reveal that a client device is highly mobile. Rather than relying solely on reception characteristics, the power management rules select a power level for an access point or client device that takes into consideration the client device's possible movement.

In addition, the protocol or protocols used in communicating between devices of the wireless network are adapted to the particular characteristics of the access point and the client devices. In one mode of operation, the method can selectively adjust one or more protocol parameters, such as the packet length, data rate, forward error correction, error detection, coding scheme, data payload length, contention period, and back-off parameters used in communication between devices, based on the analysis of information, such as the reception characteristics, status characteristics, utilization characteristics, and mobility characteristics of these devices. In this fashion, the protocol parameters can optionally be adapted based on the conditions of the network, including not only the mobility, utilization, status, and reception characteristics of a particular device, but the mobility, utilization, status, and reception characteristics of a plurality of devices, including how well each device receives transmissions from other devices.

In particular, the access point can select a first protocol parameter for transmissions by the access point to a first client device when, based on assessment of its own characteristics, and characteristics received from other devices including other client devices and potentially other access points in the region, conditions are detected that warrant a change in protocol parameters, such as when an existing or potential hidden terminal condition is detected. In a mode of operation, the access point, when the existing or potential hidden terminal condition is detected, selects a second protocol parameter for transmissions by the first client device to the access point transceiver and sends the second protocol parameter to the first client device with a command for the first client device to implement the second protocol parameter. In addition, the access point, when the existing or potential hidden terminal condition is detected, selects a third protocol parameter for transmissions by access point transceiver circuitry to a second client device, the third protocol parameter differing from the second protocol parameter. Further, the access point, when the existing or potential hidden terminal condition is detected, selects a fourth protocol parameter for transmissions by the second client device to the access point transceiver and sends the fourth protocol. parameter to the second client device with a command for the second client device to implement the fourth protocol parameter. These protocol parameters can be of different kinds, for instance, the protocol parameters can include parameters such as an error correcting code parameter, a packet length parameter, a data payload length, and a contention parameter, data rate, an error detection parameter, coding scheme, and back-off parameters used in communication between devices, etc.

Figure 11:
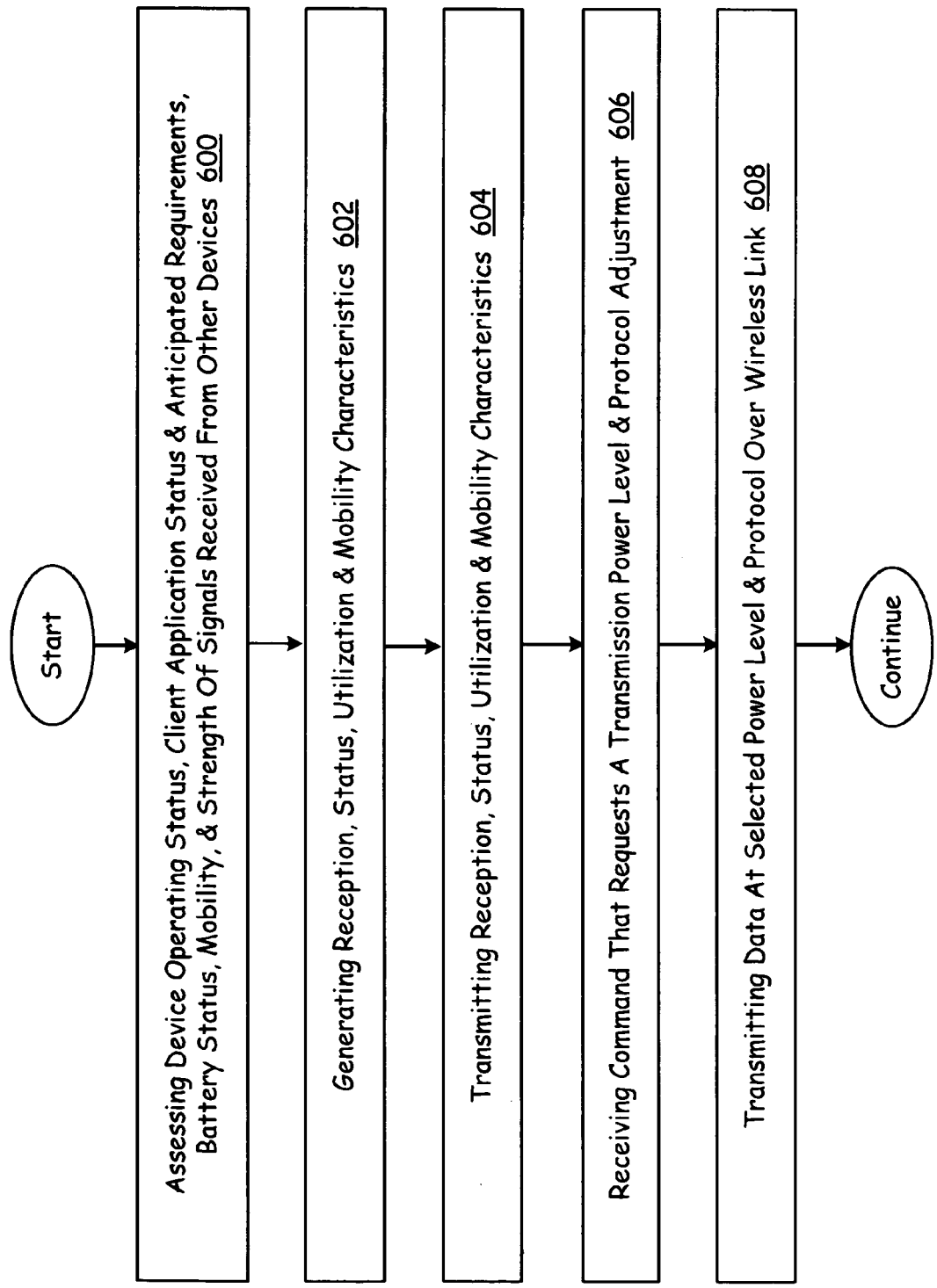
FIG. 11 presents a flowchart representation of a method that can be used in a terminal, client device and/or an integrated circuit in accordance with an embodiment of the present invention.

FIG. 11 presents a flowchart representation of a method that can be used in a terminal, client device and/or an integrated circuit in accordance with an embodiment of the present invention. In particular, a method is presented for use in conjunction with one or more features and functions presented in association with FIGS. 1-10. This method is well suited for being implemented as operational instructions that are stored in a memory such as memory circuitry 408 and implemented using processing circuitry such as processing circuitry 406 of a client device that wirelessly communicates with an access point terminal or other client device.

In step 600, parameters such as operating status, client application status, anticipated requirements, battery status, mobility and strength of signals received from other devices are assessed. In step 602 characteristics are generated based on the parameters assessed in step 600. In step 604, these characteristics are transmitted. In step 606 a command is received that requests a particular transmission power level and protocol adjustments such as a change in protocol parameter or change or protocol. In step 608, data is transmitted wirelessly at the selected power level and with the selected protocol.

A further mode of operation a first client device initially transmits based on a first protocol parameter. Transmissions received from both an access point, and a second client device, are evaluated and the first client device transmits to the access point a first plurality of characteristics relating to the evaluation by the first client device. A transmission from the access point is received that includes a second protocol parameter. The first client device transmits based on the second protocol parameter. The first plurality of characteristics can include mobility characteristics, utilization characteristics and/or status characteristics. The step of receiving a transmission from the access point can also include receiving a third protocol parameter, and the method can include decoding transmissions received from the access point transceiver circuitry based on the third protocol parameter.

As with the method of FIG. 10, an access point, terminal or other client device can selectively adjust one or more protocol parameters, such as the packet length, data rate, forward error correction, error detection, coding scheme, data payload length, contention period, and back-off parameters used in communication between devices, based on the analysis of information, such as the reception characteristics, status characteristics, utilization characteristics, and mobility characteristics of these devices. In this fashion, the protocol parameters can optionally be adapted based on the conditions of the network, including not only the mobility, utilization, status, and reception characteristics of a particular device, but the mobility, utilization, status, and reception characteristics of a plurality of devices, including how well each device receives transmissions from other devices.

In particular, the access point can select a first protocol parameter for transmissions by the access point to a first client device when, based on assessment of its own characteristics, and characteristics received from other devices including other client devices and potentially other access points in the region, conditions are detected that warrant a change in protocol parameters, such as when a existing or potential hidden terminal condition is detected. In a mode of operation, the access point, when the existing or potential hidden terminal condition is detected, selects a second protocol parameter for transmissions by the first client device to the access point transceiver and sends the second protocol parameter to the first client device with a command for the first client device to implement the second protocol parameter. In addition, the access point, when the existing or potential hidden terminal condition is detected, selects a third protocol parameter for transmissions by access point transceiver circuitry to a second device, the third protocol parameter differing from the second protocol parameter. Further, the access point, when the existing or potential hidden terminal condition is detected, selects a fourth protocol parameter for transmissions by the second client device to the access point transceiver and sends the fourth protocol parameter to the second client device with a command for the second client device to implement the fourth protocol parameter. These protocol parameters can be of different kinds, for instance, the protocol parameters can include parameters such as an error correcting code parameter, a packet length parameter, a data payload length, and a contention parameter, data rate, an error detection parameter, coding scheme, and back-off parameters used in communication between devices, etc.

Figure 12:
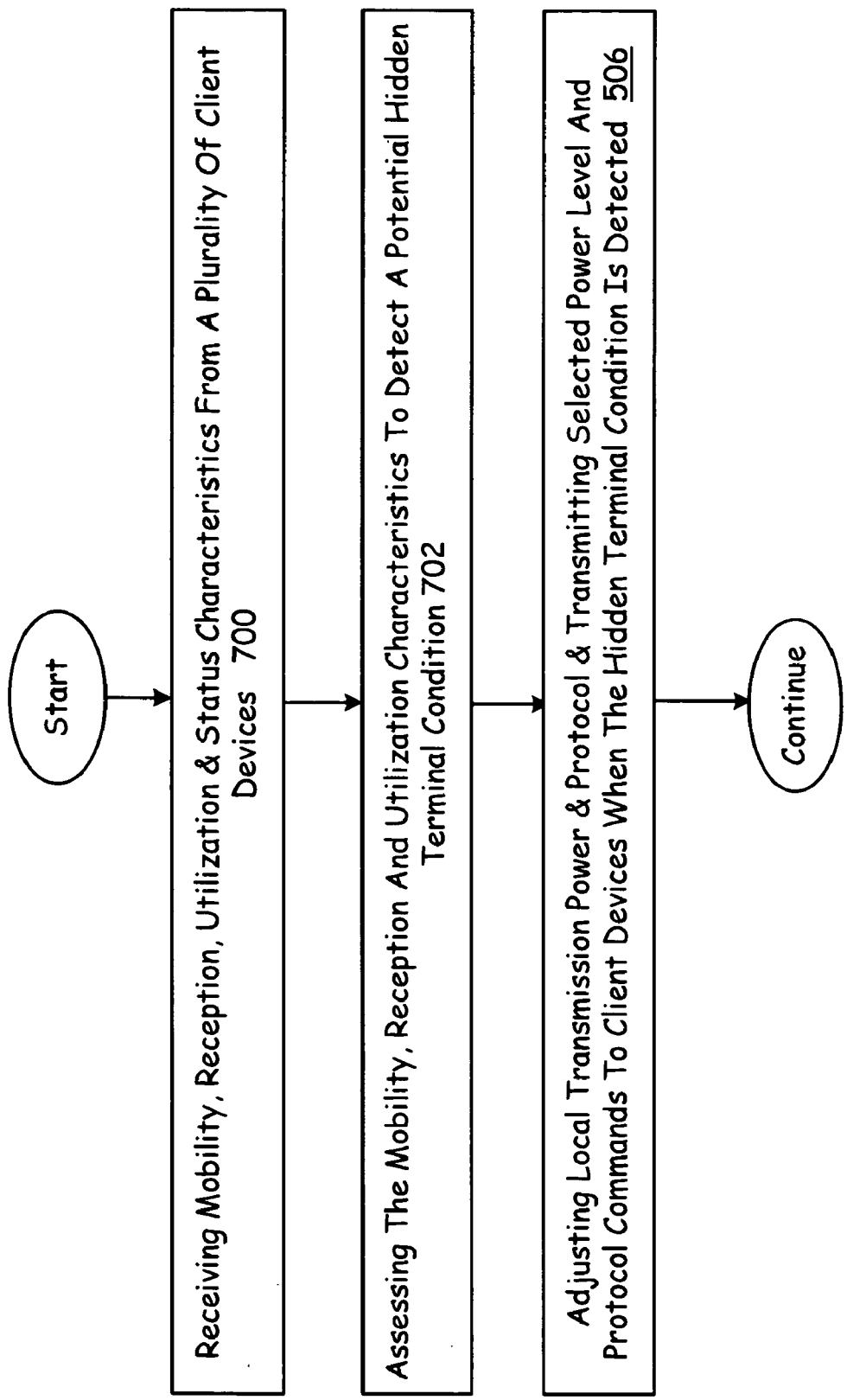
FIG. 12 presents a flowchart representation of a method that can be used in a terminal, access point and/or an integrated circuit in accordance with an embodiment of the present invention.

FIG. 12 presents a flowchart representation of a method that can be used in a terminal, access point and/or an integrated circuit in accordance with an embodiment of the present invention. In particular, a method is presented for use in conjunction with one or more features and functions presented in association with FIGS. 1-11. This method is well suited for being implemented as operational instructions that are stored in a memory such as memory circuitry 306 and implemented using processing circuitry such as processing circuitry 304 of an access point that wirelessly couples a first client device and a second client device to a packet switched backbone network.

In step 700, characteristics such as mobility, reception, utilization and status characteristics are received from a plurality of client devices that include the first and second client devices. In step 702, these characteristics are assessed to detect a potential hidden terminal condition between the first and second client devices. In step 704, the local transmission power and protocol is adjusted and the selected transmit power levels and protocols are determined for the clients devices and sent to the client devices along with commands to implement the selected power levels and protocols.

In a mode of operation, a first plurality of characteristics are received relating to an evaluation by the first client device of transmissions received by the first client device from both the access point and the second client device. A second plurality of characteristics are received relating to an evaluation by the second client device of transmissions received by the second client device from both the access point and the first client device. Both the first plurality of characteristics and the second plurality of characteristics are assessed and, based on the assessment, a hidden terminal condition is detected. A first protocol parameter is selected for transmissions by the access point to the first client device when the hidden terminal condition is detected. A second protocol parameter can likewise be selected, when the hidden terminal condition is detected, for transmissions by the first client device to the access point and sent to the first client device with a command for the first client device to implement the second protocol parameter. In addition, a third protocol parameter can be selected for transmissions by access point transceiver circuitry to the second client transceiver when the hidden terminal condition is detected, the third protocol parameter differing from the first protocol parameter. Further, a fourth protocol parameter can likewise be selected, when the hidden terminal condition is detected, for transmissions by the second client device to the access point and sent to the second client device with a command for the second client device to implement the fourth protocol parameter.

As with the method of FIG. 10, an access point, terminal or other client device can selectively adjust one or more protocol parameters, such as the packet length, data rate, forward error correction, error detection, coding scheme, data payload length, contention period, and back-off parameters used in communication between devices, based on the analysis of information, such as the reception characteristics, status characteristics, utilization characteristics, and mobility characteristics of these devices. In this fashion, the protocol parameters can optionally be adapted based on the conditions of the network, including not only the mobility, utilization, status, and reception characteristics of a particular device, but the mobility, utilization, status, and reception characteristics of a plurality of devices, including how well each device receives transmissions from other devices.

In particular, the access point can select a first protocol parameter for transmissions by the access point to a first client device when, based on assessment of its own characteristics, and characteristics received from other devices including other client devices and potentially other access points in the region, conditions are detected that warrant a change in protocol parameters, such as when a hidden terminal condition is detected. In a mode of operation, the access point, when the hidden terminal condition is detected, selects a second protocol parameter for transmissions by the first client device to the access point transceiver and sends the second protocol parameter to the first client device with a command for the first client device to implement the second protocol parameter. In addition, the access point, when the hidden terminal condition is detected, selects a third protocol parameter for transmissions by access point transceiver circuitry to a second device, the third protocol parameter differing from the second protocol parameter. Further, the access point, when the hidden terminal condition is detected, selects a fourth protocol parameter for transmissions by the second client device to the access point transceiver and sends the fourth protocol parameter to the second client device with a command for the second client device to implement the fourth protocol parameter. These protocol parameters can be of different kinds, for instance, the protocol parameters can include parameters such as an error correcting code parameter, a packet length parameter, a data payload length, and a contention parameter, data rate, an error detection parameter, coding scheme, and back-off parameters used in communication between devices, etc.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a wireless network, terminal, access point, client device, integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A wireless network in a communication infrastructure having a packet switched backbone network, the wireless network comprising:
   an access point, communicatively coupled to the packet switched backbone network, having access point processing circuitry and access point wireless transceiver circuitry;
   a first client device having first client processing circuitry and first client wireless transceiver circuitry;
   a second client device having second client processing circuitry and second client wireless transceiver circuitry;
   the access point processing circuitry, using the access point wireless transceiver circuitry and an associated set of communication parameters, manages communication both between the first client wireless transceiver circuitry and the packet switched backbone network, and between the second client wireless transceiver circuitry and the packet switched backbone network;
   the first client processing circuitry attempts to detect transmissions from the second client wireless transceiver circuitry via the first client wireless transceiver circuitry;
   the access point processing circuitry, based on at least the attempt to detect transmissions from the second client wireless transceiver circuitry by the first client processing circuitry, identifies a hidden terminal condition; and
   the access point processing circuitry attempts to address the hidden terminal condition by altering at least one parameter of the associated set of communication parameters.

2. The wireless network of claim 1, wherein the access point processing circuitry communicates the at least one parameter to the second client device.

3. The wireless network of claim 2, wherein the associated set of communication parameters defines a first protocol, and the altering of the at least one parameter of the associated set of communication parameters defines a second protocol.

4. The wireless network of claim 1, wherein the attempt to address the hidden terminal condition comprising an attempt to eliminate the hidden terminal condition.

5. The wireless network of claim 1, wherein attempt to address the hidden terminal condition comprising an attempt to accommodate the hidden terminal condition.

6. The wireless network of claim 1, wherein the access point processing circuitry also considers mobility information associated with the second client device to identify the hidden terminal condition.

7. The wireless network of claim 1, wherein the hidden terminal condition comprising an existing hidden terminal condition.

8. The wireless network of claim 1, wherein the hidden terminal condition comprising a potential hidden terminal condition.

9. The wireless network of claim 1, wherein the transmissions from the second wireless transceiver circuitry that the first client processing circuitry attempts to detect comprise at least a portion of an ongoing data exchange.

10. The wireless network of claim 1, wherein the transmissions from the second wireless transceiver circuitry that the first client processing circuitry attempts to detect comprise a test signal.

11. A communication network comprising:
a first device having a first wireless transceiver;
a second device having a second wireless transceiver;
a third device having a third wireless transceiver;
the second device generates a first reception characteristic based on at least one transmission from the third wireless transceiver, and the second device transmits the first reception characteristic to the first wireless transceiver of the first device;
the third device generates a second reception characteristic based on at least one transmission from the second wireless transceiver, and the third device transmits the second reception characteristic to the first wireless transceiver of the first device; and
the first device, based on the first reception characteristic and the second reception characteristic identifies a hidden terminal condition and, when the hidden terminal condition id detected, selects a first protocol parameter for transmissions by the first transceiver circuitry to the third transceiver circuitry and a second protocol parameter for transmissions by the first transceiver circuitry to the second transceiver circuitry, and the first protocol parameter differs from the second protocol parameter.

12. The communication network of claim 11, wherein the first device is further operable to select a third protocol parameter for transmissions by the second device to the first wireless transceiver and send the third protocol parameter to the second device.

13. The communication network of claim 11, wherein the first device is further operable to select a fourth protocol parameter for transmissions by the third device to the first wireless transceiver and send the fourth protocol parameter to the third device, and the third protocol parameter differs from the fourth protocol parameter.

14. The communication network of claim 11, wherein the at least one transmission from the third wireless transceiver comprises at least a portion of an ongoing data exchange.

15. The communication network of claim 11, wherein the at least one transmission from the third wireless transceiver comprises at least one test signal exchange.

* * * * *